United States Patent
Zehnder et al.

(10) Patent No.: US 9,604,498 B2
(45) Date of Patent: Mar. 28, 2017

(54) WHEEL ASSEMBLY

(71) Applicant: Alcoa Inc., Pittsburgh, PA (US)

(72) Inventors: Craig M. Zehnder, Akron, OH (US); Greg Peer, Delmont, PA (US); James Burg, Verona, PA (US); Stephen Leonard, Sarver, PA (US); Henry Sklyut, Delmont, PA (US); John Cobes, Lower Burrell, PA (US); Anton Rovito, Parma, OH (US); Gabriele Ciccola, Hudson, OH (US); Kelly Weiler, Oakmont, PA (US); Michael Kulak, Murrysville, PA (US); James Black, North Ridgeville, OH (US); Glenn Jarvis, Allison Park, PA (US); Wilson Lee, Northfield, OH (US); Grant DeGeorge, Strongsville, OH (US)

(73) Assignee: Arconic Inc., Pittsburgh, PA (US)

( * ) Notice: Subject to any disclaimer, the term of this patent is extended or adjusted under 35 U.S.C. 154(b) by 0 days.

(21) Appl. No.: 14/613,736

(22) Filed: Feb. 4, 2015

(65) Prior Publication Data
US 2015/0217599 A1 Aug. 6, 2015

Related U.S. Application Data

(60) Provisional application No. 61/935,656, filed on Feb. 4, 2014.

(51) Int. Cl.
*B60B 25/00* (2006.01)
*B60B 25/12* (2006.01)
(Continued)

(52) U.S. Cl.
CPC .............. *B60B 25/12* (2013.01); *B60B 11/02* (2013.01); *B60B 25/18* (2013.01); *B60B 25/20* (2013.01); *B60B 2360/104* (2013.01)

(58) Field of Classification Search
CPC ......... B60B 11/06; B60B 25/12; B60B 25/22; B60B 9/04; B60B 1/06; B60B 25/14; B60B 25/00
See application file for complete search history.

(56) References Cited

U.S. PATENT DOCUMENTS 1,499,739 A 7/1924 Klaus et al.
3,623,772 A * 11/1971 Walther ................. B60B 11/06
301/13.2

(Continued)

FOREIGN PATENT DOCUMENTS

JP 2006-306261 A 11/2006

OTHER PUBLICATIONS

International Search Report and Written Opinion mailed May 11, 2015 in regard to International Application No. PCT/US2015/014407, filed Feb. 4, 2015.

*Primary Examiner* — Hau Phan
(74) *Attorney, Agent, or Firm* — Greenberg Traurig, LLP

(57) ABSTRACT

A wheel for a pneumatic tire has a rim with one monolithic bead seat and a removable beat seat. The removable bead seat has two halves that embrace the rim and engage a groove to retain the tire. The removable bead seat may have a second lip either monolithically formed or as a part of a separate retainer that bolts to the bead seat. The wheel may be made from aluminum alloy.

28 Claims, 17 Drawing Sheets

(51) Int. Cl.
    *B60B 11/02*     (2006.01)
    *B60B 25/18*     (2006.01)
    *B60B 25/20*     (2006.01)

(56) References Cited

U.S. PATENT DOCUMENTS

| | | | | |
|---|---|---|---|---|
| 4,021,077 A | | 5/1977 | Pringle | |
| 4,241,775 A | * | 12/1980 | Jackson | B60B 25/22 152/375 |
| 4,369,826 A | * | 1/1983 | Hendrickson | B60C 29/02 152/410 |
| 4,407,348 A | * | 10/1983 | Suckow | B60B 25/14 152/410 |
| 4,902,074 A | * | 2/1990 | DeRegnaucourt | B60B 11/06 301/10.1 |
| 6,439,282 B1 | * | 8/2002 | Kimura | B60B 9/04 152/158 |
| 6,796,345 B2 | * | 9/2004 | Kimura | B60B 9/04 152/156 |
| 7,284,584 B2 | * | 10/2007 | Kimura | B60B 1/06 152/396 |
| 8,746,396 B2 | * | 6/2014 | Vallejo | B60B 11/06 180/383 |

\* cited by examiner

WHEEL ASSEMBLY

CROSS REFERENCE TO RELATED APPLICATIONS

This application claims the benefit of U.S. Provisional Application No. 61/935,656, filed Feb. 4, 2014, entitled Wheel Assembly, which application is incorporated by reference herein in its entirety.

FIELD

The present invention relates to wheels, and more particularly, to wheels for vehicles, such as automobiles and trucks that receive a pneumatic tire and/or tube.

BACKGROUND

Various types of wheels are known, such as stamped steel wheels made in multiple pieces that allow disassembly to facilitate removal of a pneumatic tire and/or tube. Monolithically formed wheels made from aluminum alloy are also known and in common use due to their attributes of strength and light weight, which translate into functional and economic advantages, such as fuel economy and extended service life for various parts of the vehicle on which they are installed. Typically, monolithically formed wheels require specialized equipment to mount and demount the tire to/from the wheel. This is particularly true of wheels used for heavy duty vehicles, such as trucks. Notwithstanding known wheels, improved and/or alternative wheels remain desirable.

SUMMARY

The disclosed subject matter relates to a wheel for supporting a pneumatic tire and having
a generally cylindrical rim with a first bead seat peripherally disposed thereon proximate one end, the rim having a first groove in an outer peripheral surface thereof distal to the first bead seat; a removable bead seat capable of engaging the first groove, retaining the removable bead seat and the tire on the rim.

In another embodiment, the wheel is made of aluminum alloy.

In another embodiment, the first bead seat is monolithic with the rim.

In another embodiment, the removable bead seat has a plurality of sub-parts.

In another embodiment, the plurality of sub-parts includes semi-circular bead seat portions, each of which approximates a mirror image of the other and when assembled together at an axis of symmetry, approximate a solid of rotation capable of embracing the rim proximate the first groove, the solid of rotation having a generally L-shaped cross-section with a lead-in portion forming the long part of the L and an upstanding bead extending in a direction perpendicular to the lead-in portion and forming the short portion of the L-shape, the lead-in portion extending generally parallel to the rim when embracing it, each of the two bead seat portions having an inwardly directed lip extending from an inner surface on the long part of the L shape extending in a direction opposite to the upstanding bead, the lip capable of being received in the first groove when the bead seat portions are positioned on the rim embracing the rim.

In another embodiment, the inwardly directed lip is a first lip and wherein the rim has a second groove in the outer peripheral surface thereof distal to the first groove and the first bead seat and each of the bead seat portions has a second inwardly extending lip extending therefrom in a direction parallel to the direction of extension of the first lip, the second lip capable of being received in the second groove when the bead seat portions are positioned on the rim embracing the rim.

In another embodiment, the second lip is monolithically formed with the bead seat portion from which it extends.

In another embodiment, the second groove defines a flange on the rim.

In another embodiment, a plurality of apertures extend through the flange, the second lip and the rim, and further including a plurality of pins capable of passing through the apertures in the flange, the second lip and the rim, bridging the second groove and retaining each of the bead seat portions in association with the rim.

In another embodiment, the rim proximate the first groove has a reduced diameter relative to an adjacent portion proximate the bead seat, the reduced diameter portion having a diameter reduced by an amount approximating the thickness of the lead-in portions of the bead seat portions.

In another embodiment, the wheel has a mounting flange with a plurality of lug apertures at one end capable of mounting the wheel to a wheel hub.

In another embodiment, the mounting flange of a first wheel may be juxtaposed next to the mounting flange of a second wheel to form a dually that is capable of mounting to a wheel hub.

In another embodiment, the rim has a second groove in the outer peripheral surface thereof distal to the first groove and the first bead seat and further comprising a retainer selectively attachable to at least one of the bead seat portions by threaded fasteners, a second lip extending from the retainer, the second lip capable of being received in the second groove when the bead seat portion is positioned on and embracing the rim.

In another embodiment, a plurality of retainers are coupled to a plurality of bead seat portions.

In another embodiment, the retainers are arcuate in shape.

In another embodiment, the threaded fasteners extend through apertures in the retainers and are received in threaded apertures in the bead seat portions.

In another embodiment, the bead seat portions have a recess complementary in shape to the retainers for receiving the retainers when selectively coupled thereto.

In another embodiment, at least one retainer bridges and couples to a plurality of bead seat portions.

In another embodiment, the retainers have a peripheral ledge that bears against an edge of the second groove and is capable of constraining rotation of the retainers and a conjoined bead seat portion in a direction perpendicular to an axis of the wheel under the influence of pressure from a tire mounted on the wheel.

In another embodiment, the threaded apertures have a threaded insert therein.

In another embodiment, the threaded insert is a coil.

In another embodiment, the lead-in portion of each of the semi-circular members exhibits a gradually increased thickness from an edge thereof to the bead seat.

In another embodiment, the pins prevent rotation of the removable bead sesat relative to the rim.

In another embodiment, the pins retain the removable bead seat on the rim when the tire is deflated.

In another embodiment, the lead-in portion is capable of preventing tire inflation load from displacing an associated bead seat portion.

In another embodiment, the lead-in portion is capable of directing tire inflation pressure force radially towards an axis of the wheel.

In another embodiment, the removable bead seat encircles the rim, preventing removal of the bead seat from the rim without disassembling the removable bead seat.

In another embodiment, the removable bead seat is capable of being retained on the rim when the tire is deflated, preventing removal without diassembling the removable bead seat.

In another embodiment, each recess defines a boundary preventing withdrawal of the retainer received therein when the tire is inflated and irrespective of the presence of threaded fasteners.

In another embodiment, the retainer is a ring and the second lip is castellated to define a plurality of tabs and intermittent spaces and the rim has a plurality of slots communicating with the second groove, the tabs capable of inserting through the slots in a first rotational orientation coaxial with the wheel to enter the second groove and capable of being rotated on the rim to a second position where the slots and tabs are not aligned.

In another embodiment, a wheel for supporting a pneumatic tire has a rim with a first bead seat peripherally disposed thereon proximate one end, the rim having a pair of spaced circumferential grooves in an outer peripheral surface thereof distal to the first bead seat; and a plurality of removable bead seat portions each having an arcuate shape complementary to an outer surface of the rim, each of the removable bead seat portions having a pair of inwardly directed annular lips extending from an inner surface of each bead seat portion capable of engaging the pair of spaced grooves when the removable bead seat portions are arranged circumferentially about the rim holding the tire between the first bead seat and an ensemble of the plurality of removable bead seat portions.

In another embodiment, each of the bead seats has a first portion having a first of the pair of annular lips and a second portion having a second of the pair of annular lips, the first portion having an annular recess to receive the second portion, which is received within the recess and further including a plurality of fasteners extending through the second portion and received in the first portion, the fasteners capable of securing the first portion to the second portion and holding the removable bead seat portion to the rim.

BRIEF DESCRIPTION OF THE DRAWINGS

For a more complete understanding of the present disclosure, reference is made to the following detailed description of exemplary embodiments considered in conjunction with the accompanying drawings.

DETAILED DESCRIPTION OF EXEMPLARY EMBODIMENTS

Figure 1:
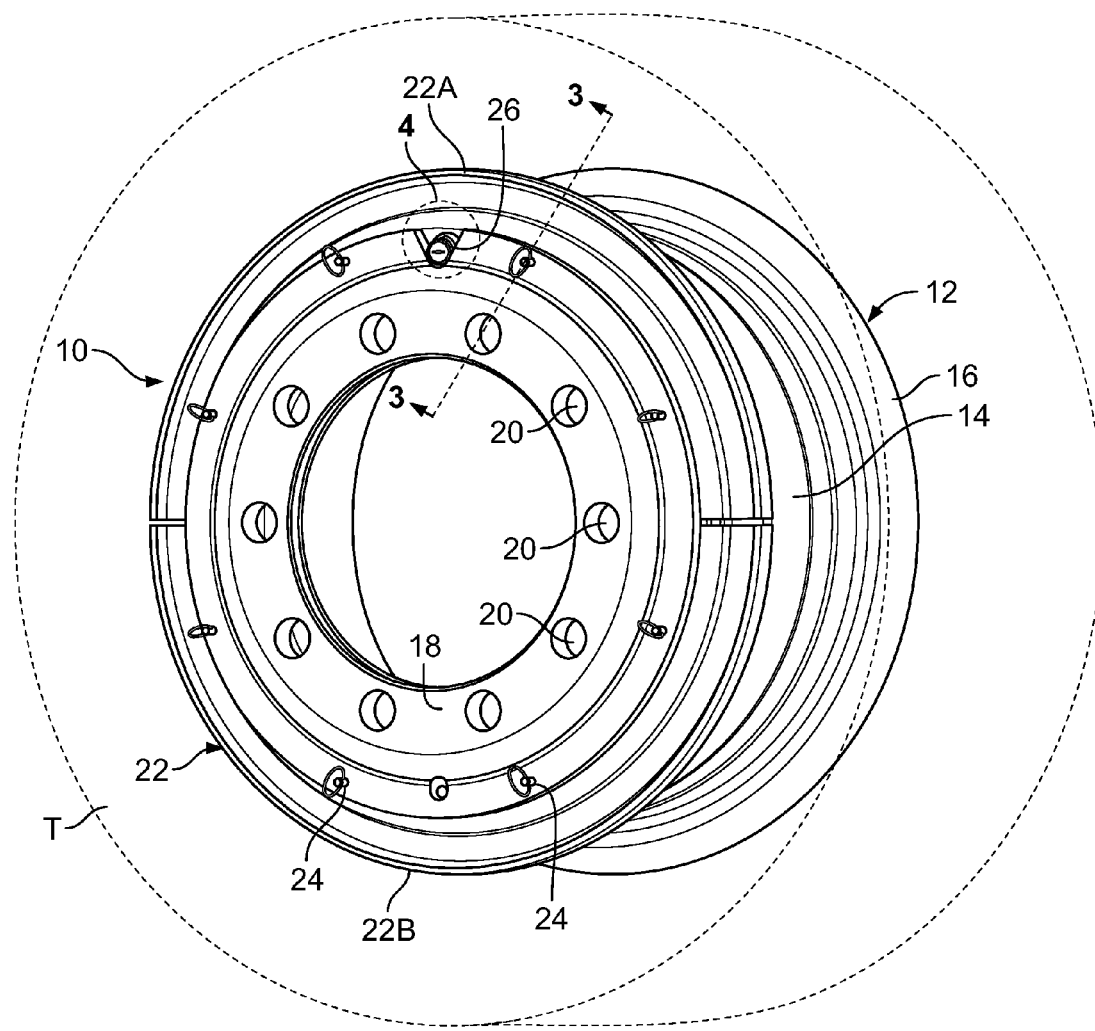
FIG. 1 is perspective view of a wheel in accordance with an embodiment of the present disclosure.
Figure 2:
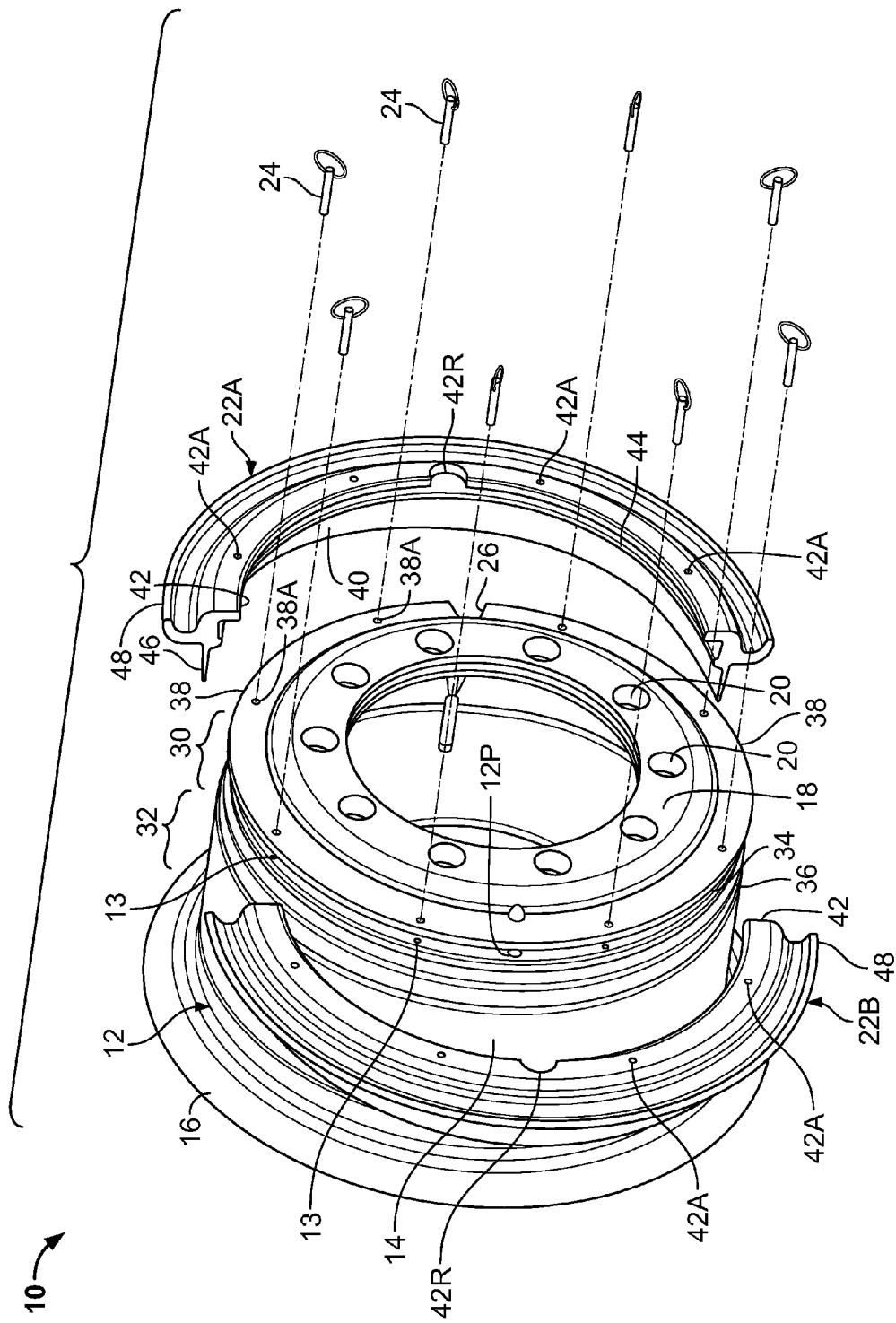
FIG. 2 is an exploded view of the wheel of FIG. 1.
Figure 3:
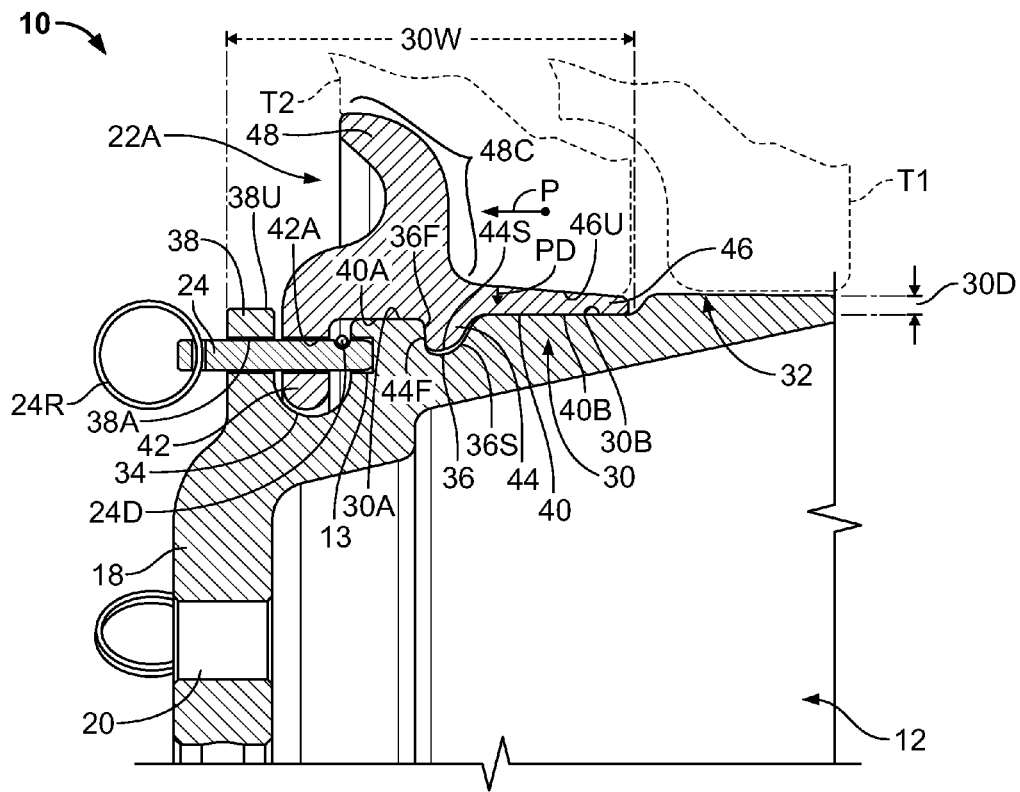
FIG. 3 is a cross-sectional view of the wheel of FIG. 1, taken along section line 3-3 and looking in the direction of the arrows.

FIGS. 1, 2 and 3 show a wheel 10 on which a pneumatic tire/tube T (shown diagrammatically in dashed lines), may be mounted. The wheel 10 has a monolithic rim 12 with a cylindrically shaped portion 14, a bead seat 16 and a mounting flange 18 with lug bolt apertures 20. A removable bead seat 22 having semi-circular bead seat portions 22A, 22B (which, in the case of two bead seat portions 22A, 22B, can be denominated, "bead seat halves") embraces the rim 12 proximate the conjunction of the cylindrical portion 14 and the mounting flange 18. The bead seat portions 22A, 22B may be removably retained to the rim 12 and removed from the rim 12 by a plurality of pins 24. The pins 24 prevent rotation of the bead seat portions 22A, 22B on the rim 12 and, in the case of air loss, prevent detachment of the bead seat portions 22A, 22B from the rim 12. A valve aperture 26 provides access to an air valve 28 (FIG. 4) for inflating the tube/tire T mounted on the wheel 10.

As shown in FIGS. 2 and 3, the cylindrical portion 14 of the rim 12 has a portion 30 with a reduced diameter relative to an adjacent portion 32. Portion 30, when viewed in cross section, had a width 30W and a depth 30D. The reduced diameter portion 30 has a first peripheral groove 34 proximate the mounting flange 18, defining an annular retainer flange 38. A second peripheral groove 36 in the reduced diameter portion 30 is positioned intermediate the first peripheral groove 34 and the adjacent portion 32. The removable bead seat semi-circular portions 22A, 22B have a generally semi-cylindrical inner surface 40 from which an inwardly directed semi-annular ring 42 and an inwardly directed semi-annular lip 44 extend. In the use of the terms "semi-cylindrical", "semi-annular", "semi-ring", in reference to the bead seat portions 22A, 22B, it is understood that these terms are applied when the pair of bead seat portions 22A, 22B are considered separately. When juxtaposed in an annular fashion (assembled together at an axis of symmetry), e.g., in the assembled wheel 10, these structures approximate a structure of rotation, i.e., a cylinder, a ring, an annulus, etc. and the removable bead seat 22 approximates a solid of rotation. When the removable bead seat 22 is in place on the rim 12, the inwardly directed semi-annular ring 42 of each bead seat portion 22A, 22B is received in the first peripheral groove 34 and the inwardly directed semi-annular lip 44 is received in the second peripheral groove 36. A lead-in portion 46 of the removable bead seat portions 22A, 22B has an upper surface 46U that has a slope of, e.g., 5 degrees relative to interior cylindrical surface 40, and that transitions to the curved surface 48C of the upstanding bead portion 48 of the bead seat portions 22A, 22B. When a tire T and/or an enclosed tube is mounted on the wheel 10, the tire may be compressed against the monolithic bead seat 16 such that one tire wall is pushed proximate the monolithic bead seat 16 and the other tire wall occupies a position approximating position T1 (a diagrammatic depiction of a tire wall proximate the tire bead, expressed in dotted lines). The bead seat portions 22A, 22B may then be positioned about the rim 12, embracing the rim 12, as shown in FIG. 3. The pins 24 may be inserted through apertures 38A in the annular retainer flange 38, through apertures 42A in the inwardly directed annular ring 42 and into blind apertures 13 in the rim 12 to retain the bead seat portions 22A, 22B on the rim 12. The pins 24 may feature a spring-urged detent 24D to prevent inadvertent withdrawal of the pins 24 and a ring 24R that can be grasped and pulled to purposely withdraw the pins 24.

Figure 18:
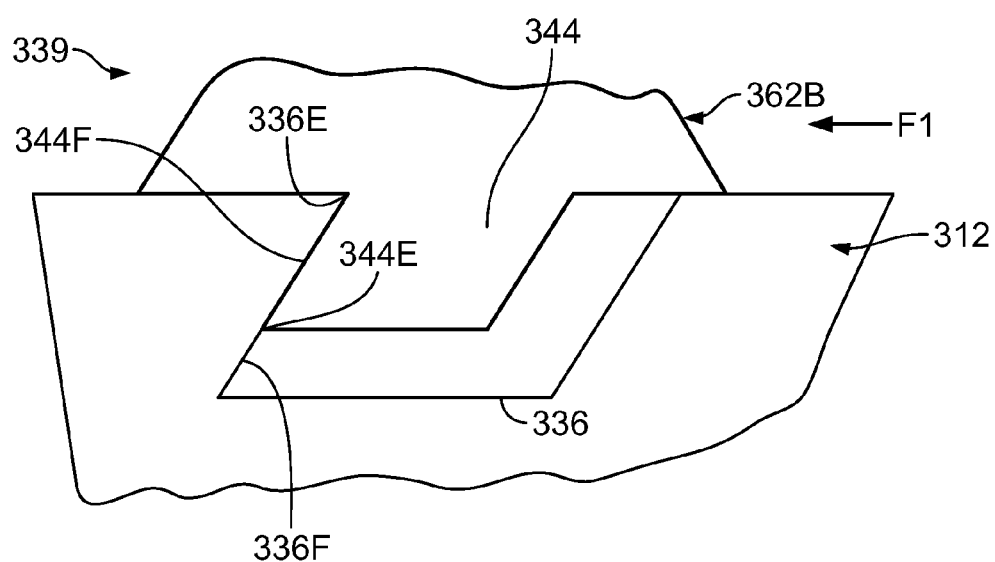
FIG. 18 is a diagrammatic view of an alternative embodiment of a bead seat to rim engagement.

After the bead seat portions 22A, 22B are installed on the rim 12, the tire/tube T may be inflated, pushing the tire wall and bead area into the position shown as T2 in FIG. 3. As the tire inflates under the influence of pressure force P, it slips over the lead-in portion 46 and into firm contact with the curved surface 48C of the upstanding bead portion 48. The sloped, upper surface 46U converts the outwardly directed pressure force P into a radially, inwardly-directed force PD due to the limited radial dimension of the tire in the bead area, which is stretched by the increasing diameter defined by lead-in portion 46 as it approaches the upstanding bead portion 48. The radially, inwardly directed force PD firmly engages the removable bead seat portions 22A, 22B against the rim 12, such the interior surfaces 40 of the bead seats 22A, 22B are pressed against the exterior surfaces of the reduced diameter portion 30. Surfaces 40A, 40B (FIG. 3) are pressed against surfaces 30A, 30B, forcing the inwardly directed semi-annular ring 42 and inwardly directed semi-annular lip 44 into engagement with the first and second peripheral grooves 34, 36, respectively. At the same time, the force directed along vector P presses the surface 44F of the inwardly directed semi-annular lip 44 into engagement with surface 36F of the second peripheral groove 36. The lead-in portion 46 functions as an elongated flange which prevents the tire inflation load from rotating or detaching the bead seat halves 22a, 22B, directing the tire inflation pressure force radially (hoop loading) towards the center of the wheel 10. In the embodiment shown in FIG. 3, the surfaces 36F, 44F are parallel to each other. In an alternative embodiment, the surfaces 36F, 44F may remain parallel, but be canted clockwise to a selected degree to establish a pawl-type engagement, as shown in FIG. 18, wherein the surfaces are renumbered 336F, 344F.

Once the first removable bead seat portion 22A is installed on the rim 12, the pins 24 may be inserted to retain it at a desired position while the second removable bead seat portion 22B is installed. The pins 24 may also be used as a device for assuring that the removable bead seats remain in their proper position as the tire is inflated. The removable bead seat 22 is retained on the rim 12 by the tire T when the tire T is inflated, but is not dependent on the pins 24 for retention to the rim 12. For example, in the case of a los of inflation air in the tire, the pins 24 prevent the bead seat portions 22A, 22B from detaching from the rim 12. The pins 24 may also be used to facilitate retaining a selected alignment of the apertures in the rim and bead seat for access to a tire valve 28 prior to inflation, as shall be described below. The pins 24 may be made of steel, stainless steel or another material and may optionally be coated or plated with a coating, such as zinc, that resists corrosion and galvanic interaction with the rim 12 and removable bead seat 22 due to dissimilarity of metals.

The transition of surfaces defining the grooves 34, 36, the surfaces 30A, 30B of the reduced diameter portion, the inwardly directed annular ring 42 and the annular lip 44 and surfaces 40A, 40B of the semi-cylindrical inner surface 40 may be radiused to reduce stress concentration. The first and second peripheral grooves 34, 36 may define a greater volumetric space than the semi-annular ring 42 and semi-annular lip 44 which are received therein, respectively. This excess space, with respect to the first peripheral groove 34, may facilitate consistent initial assembly and installation and may also facilitate the disengagement of the removable bead seat 22 for dismounting a tire, e.g., after a substantial period of use and exposure to mud, dried grease, brake powder, hub rust, other contaminants and/or corrosion, that would otherwise cause the bead seat 22 to be difficult to remove or re-assemble. For example, for demounting a tire T, after the tire T is deflated and the bead thereof proximate the removable bead seat 22 pushed toward the monolithic bead seat 16, the removable bead seat 22 may be manually moved or struck with a tool, such as a rubber mallet, to loosen it. The clearance between the removable bead seat 22 and the rim 12 may facilitate dislodging the removable bead seat 22 from the rim 12. The rim 12 and removable bead seat 22 of the wheel 10 described above may be made of aluminum alloy, e.g., of the type known in the industry as in the 6xxx family. The rim 12, bead seat 22, etc. may also be made of other materials, such as steel or polymers, depending on the application.

FIG. 2 shows that the inwardly directed semi-annular ring 42 of each bead seat portion 22A, 22B features a plurality of apertures 42A for accommodating the passage of pins 24 to retain the removable bead seat portions 22A, 22B to the rim 12. The apertures 42A align with corresponding apertures 38A and 13 in the annular retainer flange 38 and the rim 12, respectively. The semi-annular ring 42 of each removable bead seat portion 22A, 22B also features a recess 42R, which may be aligned with valve aperture 26 on the rim 12 to allow access to an air valve 28 (FIG. 4) for filling a mounted tire/tube T with air. A port 12P in the rim 12 may also be provided to allow air fill when the wheel 10 is assembled to a like wheel 10 in a dual wheel configuration, as will be described below relative to FIGS. 5 and 6.

Figure 4:
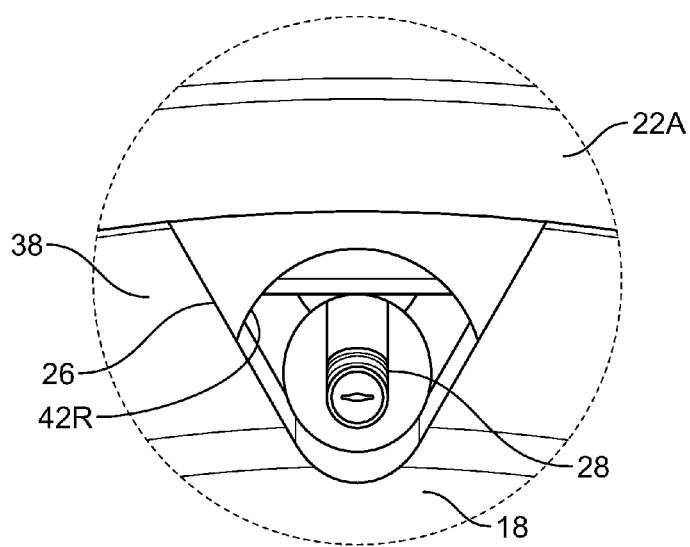
FIG. 4 is an enlarged view of a portion of the wheel of FIG. 1.

FIG. 4 shows an air valve 28 visible and accessible through the aligned valve aperture 26 and the recess 42R. The valve aperture 26 may be in the form of a V-shaped notch in the annular retainer flange 38 to allow access to the air valve 28 for inflation of the tire/tube T that is mounted on the wheel 10.

Figure 5:
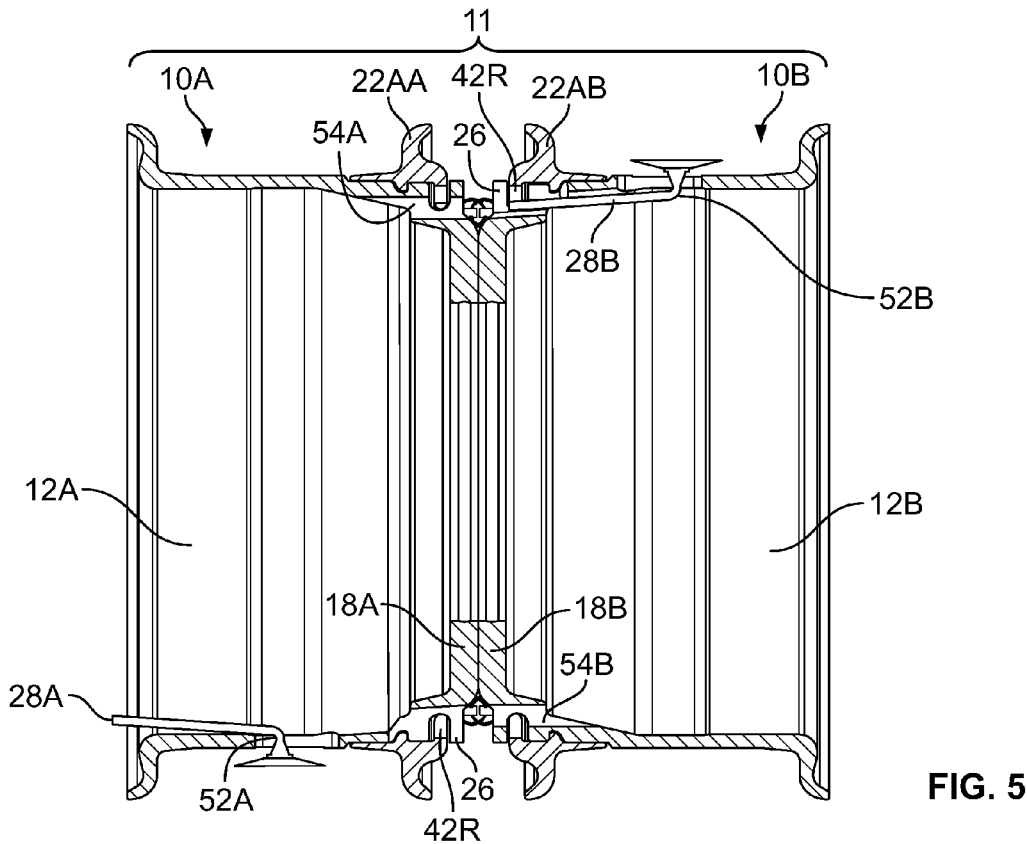
FIG. 5 is a cross-sectional view of a pair of wheels like the wheel of FIG. 1 positioned adjacent one another.
Figure 6:
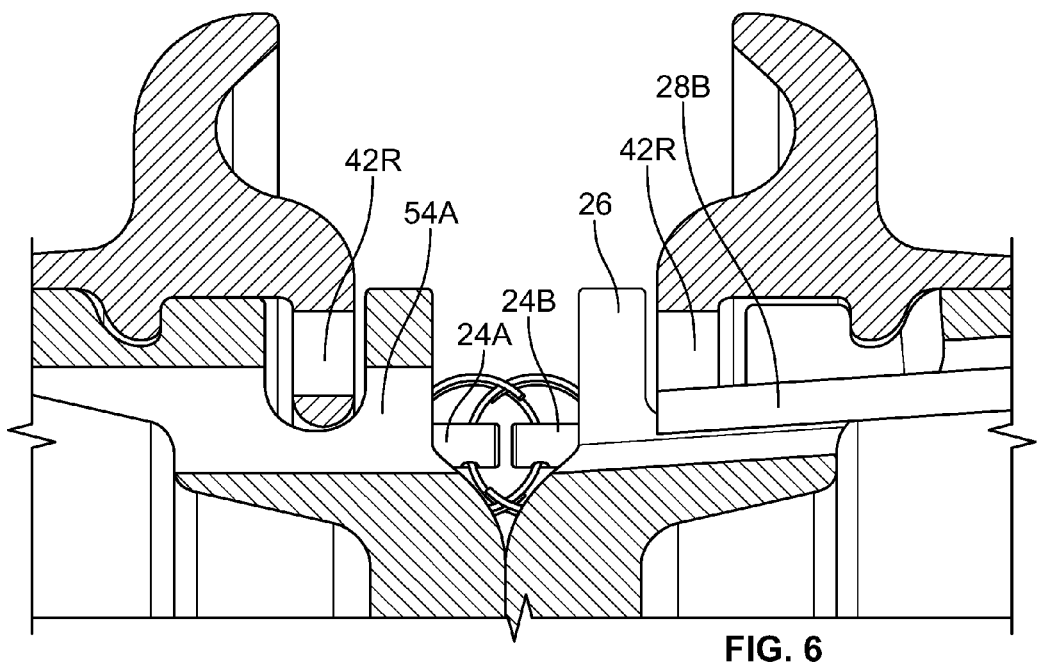
FIG. 6 is an enlarged view of a portion of the wheels of FIG. 5.

FIGS. 5 and 6 show a cross-section of a pair of wheels 10A, 10B with the mounting flanges 18A, 18B abutted together to illustrate a "dually" 11 configuration. The dually 11 may be mounted to a hub, e.g., of a rear axle of a vehicle (not shown) in a conventional manner. Valve stems 28A, 28B extend through apertures 52A, 52B in the rims 12A, 12B and through aperture 26 and recess 42R to allow inflation of a tire/inner tube (not shown) mounted on the wheels 10A, 10B. An extension aperture 54A, 54B is drilled through each of the wheels 10A, 10B radially opposite to the valve aperture 26, allowing the extension aperture 54A, 54B to be aligned with the valve stem 28B, 28A, respectively, of the adjacent wheel 10B, 10A when the wheels 10A, 10B are placed in a dually 11 configuration. An extension tube/ auxiliary valve stem (not shown) leading to a source of compressed air may be extended through the extension aperture 54A, 54B to seal against the valves stems 28A, 28B and inflate the tire/tube T installed on the respective wheel 10A, 10B. As shown in FIG. 6, the pins 24A, 24B are preferably dimensioned to allow positioning the wheels 10A, 10B in a dually 11 configuration without interfering with one another. The foregoing features enable two identical wheels 10A, 10B to be positioned next to one another in a dually 11 configuration or, alternatively, to be used as single wheels.

Figure 7:
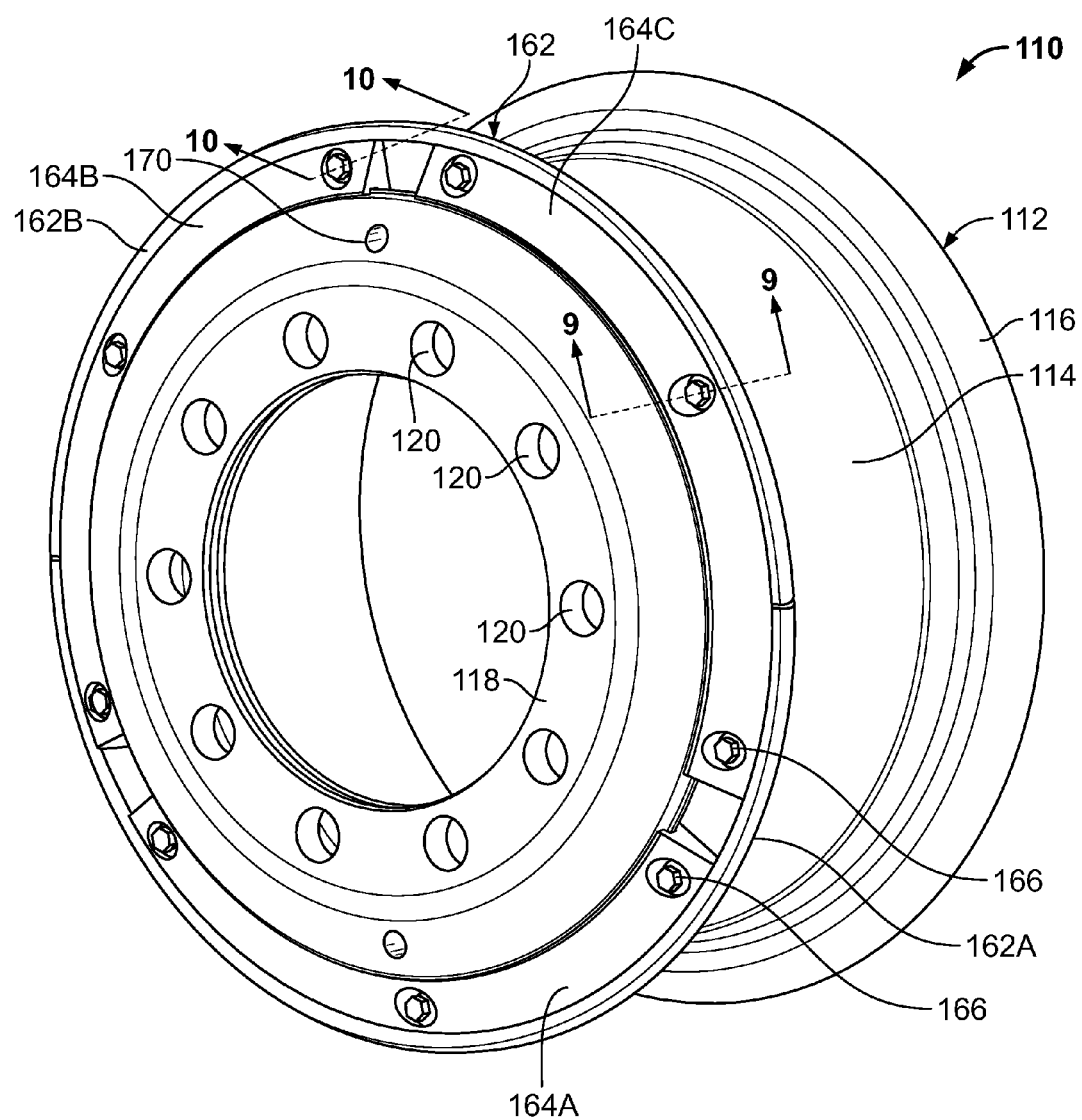
FIG. 7 is perspective view of a wheel in accordance with another embodiment of the present disclosure.
Figure 8:
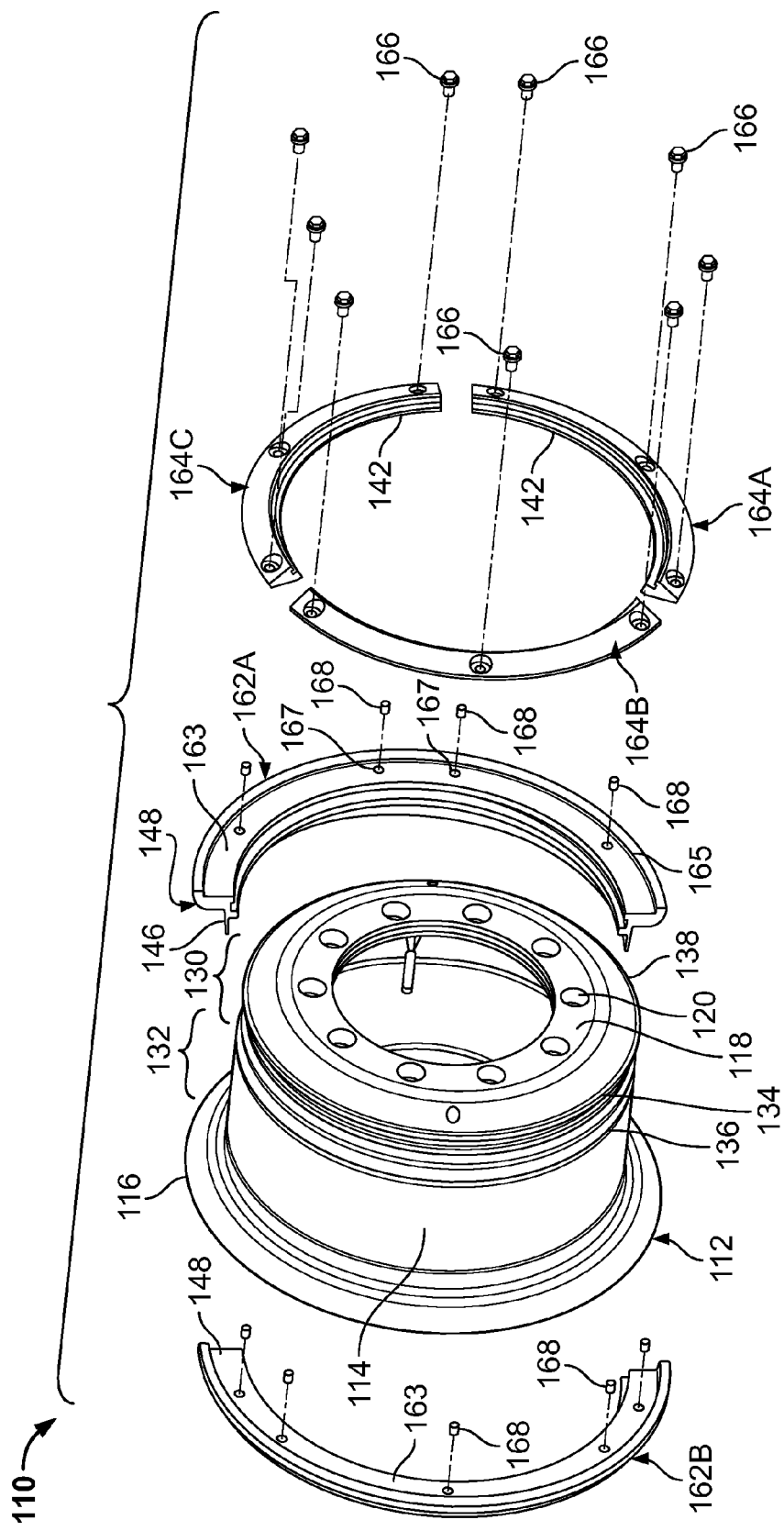
FIG. 8 is an exploded view of the wheel of FIG. 7.
Figure 9:
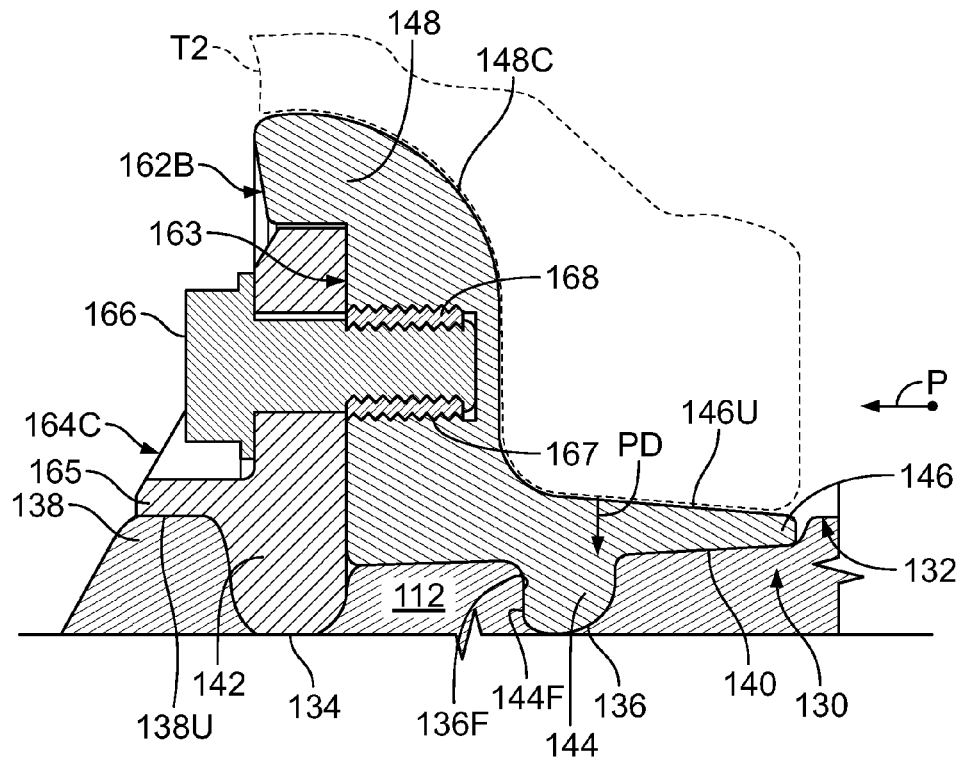
FIG. 9 is a cross-sectional view of the wheel of FIG. 7, taken along section line 9-9 and looking in the direction of the arrows.
Figure 14A:
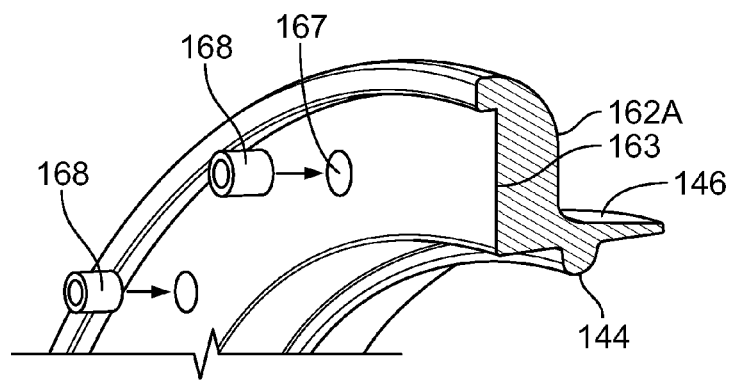
FIGS. 14A-14G is a series of schematic views of the wheel of FIG. 7, showing assembly of the wheel.

FIGS. 7, 8 and 9 show a wheel 110 with a rim 112 having a cylindrically shaped portion 114, a bead seat 116 and a mounting flange 118 with lug bolt apertures 120. A removable bead seat 162 has two semi-circular bead seat portions 162A, 162B, which embrace the rim 112 proximate the conjunction of the cylindrical portion 114 and the mounting flange 118. The removable bead seat portions 162A, 162B each have a lead-in portion 146 and an upstanding bead portion 148. The bead seat portions 162A, 162B may be retained to or removed from the rim 112 by a plurality of arcuate retainers 164A, 164B, 164C, which are secured coaxially in a facial annular recess 163 of the removable bead seat portions 162A, 162B by a plurality of bolts 166 which pass through the arcuate retainers 164A, 164B, 164C and mechanically fasten, e.g., by threaded fasteners, to the removable bead seat portions 162A, 162B. More particularly, the bolts may be received in threaded apertures 167 which may be provided with a threaded insert 168. The threaded inserts 168 may be in the form of a coil 168C (see FIG. 14A) or may be monolithic inserts with exterior and internal threading. In either case, the inserts 168 may be made from stainless steel or another metal that is compatible with the aluminum alloy from which the wheel 110 is formed. When secured to the bead seat portions 162A, 162B, the retainers 164A, 164B, 164C bridge and connect the bead seat portions 162A, 162B to form the annular removable bead seat 162 and define an inwardly-directed annular ring 142. The retainers 164A, 164B, 164C may also feature a support ledge 165 (FIG. 9) that abuts an upper surface 138U of annular retainer flange 138 to resist twisting forces exerted on the removable bead seat 162.

As shown in FIGS. 8 and 9, the cylindrical portion 114 of the rim 112 has a portion 130 with a reduced diameter relative to an adjacent portion 132. The reduced diameter portion 130 has a first peripheral groove 134 proximate the mounting flange 118, defining an annular retainer flange 138. A second peripheral groove 136 in the reduced diameter portion 130 is positioned intermediate the first peripheral groove 134 and the adjacent portion 132. The removable bead seat portions 162A 162B have a generally cylindrical inner surface 140 from which an inwardly directed annular lip 144 extends. When the removable bead seat 162 is in place on the rim 112 with the retainers 164A-164C secured in place, the inwardly directed annular ring 142 is received in the first peripheral groove 134 and the inwardly directed annular lip 144 is received in the second peripheral groove 136. The lead-in portion 146 of the bead seat portions 162A and 162B have an upper surface 146U that has a slope of, e.g., 5 degrees relative to interior cylindrical surface 140, and which transitions to the curved surface 148C of the upstanding bead portion 148. The transition of surfaces of the grooves 134, 136, the inwardly directed annular ring 142 and the annular lip 144 may be radiused to the adjoining surfaces of the rim 112, removable bead seat 162 and retainers 164A-164C, to reduce stress concentration. The first and second peripheral grooves 134, 136 may define a greater volumetric space than the annular ring 142 and annular lip 144 which are received therein, respectively, to facilitate the disengagement and reassembly of the removable bead seat 122 from the rim 112.

Figure 10:
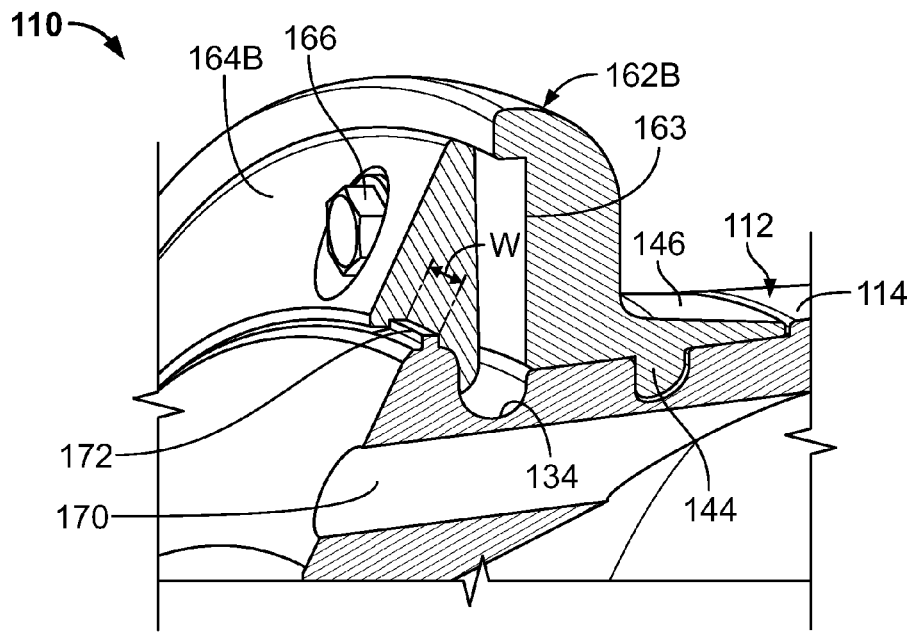
FIG. 10 is an enlarged cross-sectional view of a portion of the wheel of FIG. 7 taken along section line 10-10 and looking in the direction of the arrows.
Figure 11:
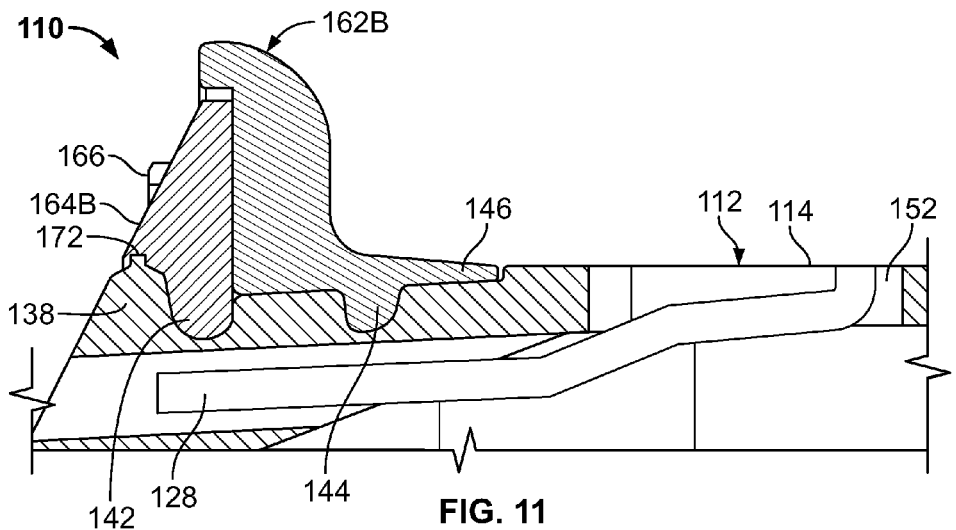
FIG. 11 is an enlarged cross-sectional view of a portion of the wheels of FIGS. 7 and 10 with a valve stem inserted therein.

FIGS. 10 and 11 show the removable beat seat portion 162B in place on the rim 112 and coupled to the retainer 164B by bolt 166. A valve aperture 170 extends through the rim 112 proximate the mounting flange 118 to provide access to a source of pressurized air for inflating a tire/tube installed on the wheel 110 through valve 128. The valve 128 extends through the rim portion 114 to reach the tire/tube via aperture 152. Optional spacer tabs 172 extending from the annular retainer flange 138 may have a circumferential width W approximating the spacing between adjacent retainers 164A-164C and establishing a given relative orientation of the retainers 164A-164C relative to the rim 112 and consequently, a selected orientation of the bead seat portions 162A, 162B relative to the rim 112 and to themselves. In an alternative embodiment, the tabs 172 are omitted. The rim 112 and removable bead seat portions 162A, 162B and retainers 164A-164C of the wheel 110 described above may be made of aluminum alloy, e.g., of the type known in the industry as in the 6xxx family. Alternatively, the rim 112, removable bead seat 122, etc. may be made from other materials, such as steel or polymer.

Figure 12:
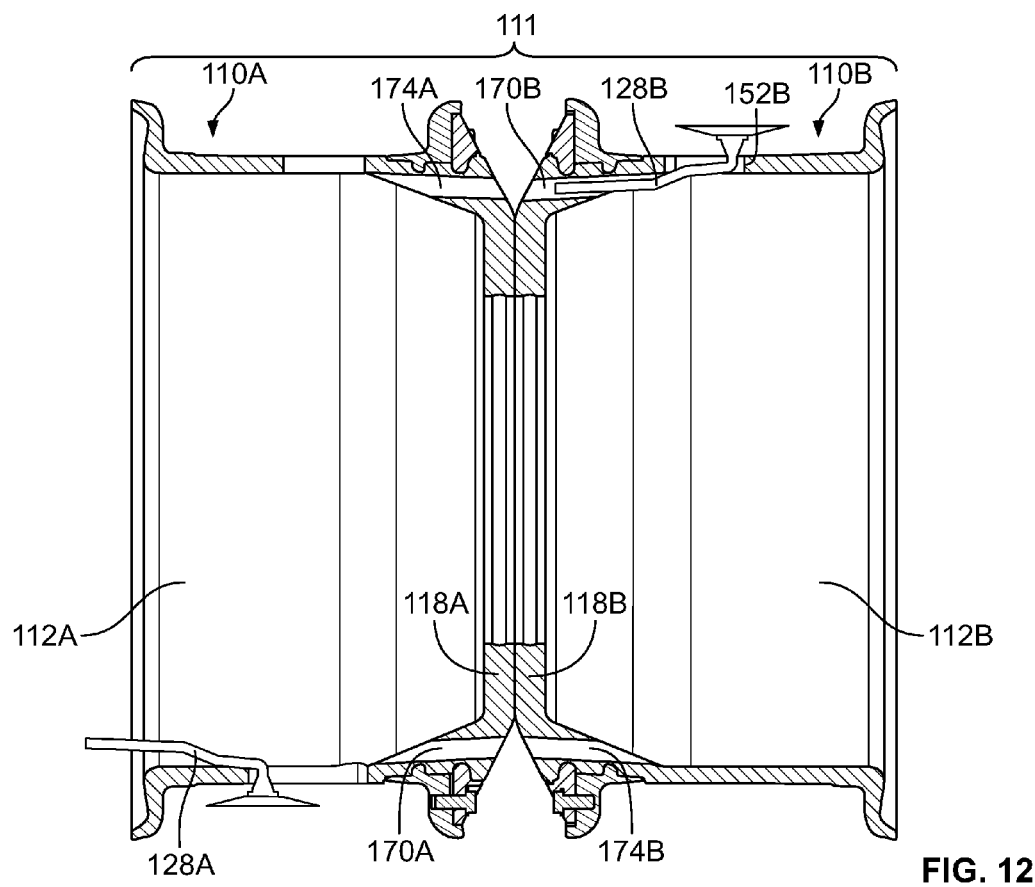
FIG. 12 is a cross-sectional view of a pair of wheels like the wheel of FIG. 7 positioned adjacent one another.
Figure 13:
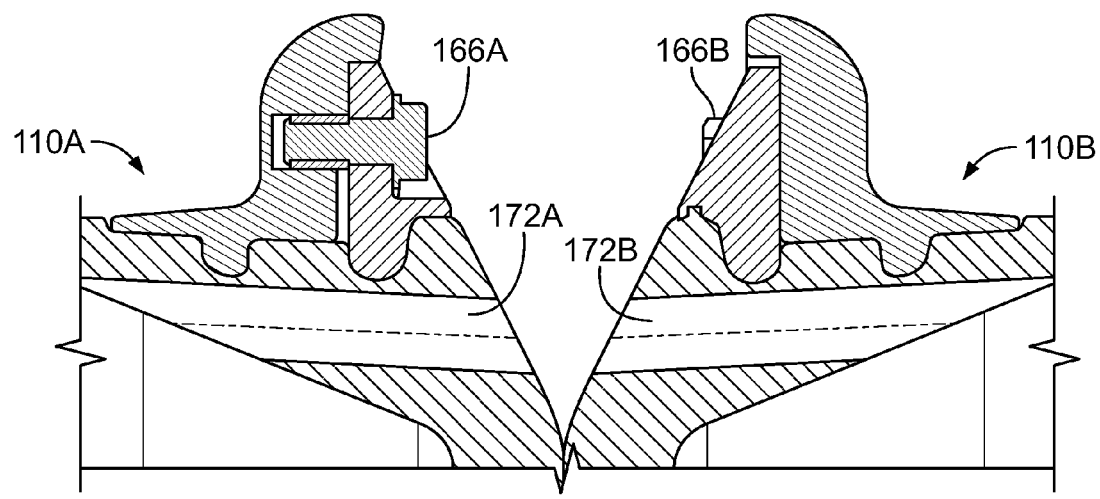
FIG. 13 is an enlarged view of a portion of the wheels of FIG. 12.

FIGS. 12 and 13 show a cross-section of a pair of wheels 110A, 110B with the mounting flanges 118A, 118B abutted together to illustrate a "dually" 111 configuration. The dually 111 may be mounted to the hub, e.g., of a rear axle of a vehicle (not shown) in a conventional manner. A valve stem 128B extends through aperture 152B in the rims 112B to allow inflation of an inner tube (not shown) captured within a tire (not shown) mounted on the wheel 110B. A similar valve 128A may be installed on rim 112A. The valve stem 128B extends through aperture 152B and is accessible through aperture 170. An extension aperture 174A, 174B is drilled through each of the wheels 110A, 110B radially opposite to the apertures 170A, 170B, respectively, and may be aligned with the aperture 170B, 170A, respectively, of the adjacent wheel 110B, 110A, when the wheels 110A, 110B are placed in a dually 111 configuration. An extension tube/auxiliary valve stem (not shown) leading to a source of compressed air may be extended through the extension apertures 174A, 174B to inflate the tire/tube installed on the respective wheel 110A, 110B. As shown in FIG. 13, the bolts 166A, 166B are dimensioned and located to allow positioning the wheels 110A, 110B in a dually 111 configuration without interfering with one another. The foregoing features enable two identical wheels 110A, 110B to be positioned next to one another in a dually 111 configuration or, alternatively, to be used as single wheels.

Figure 14B:
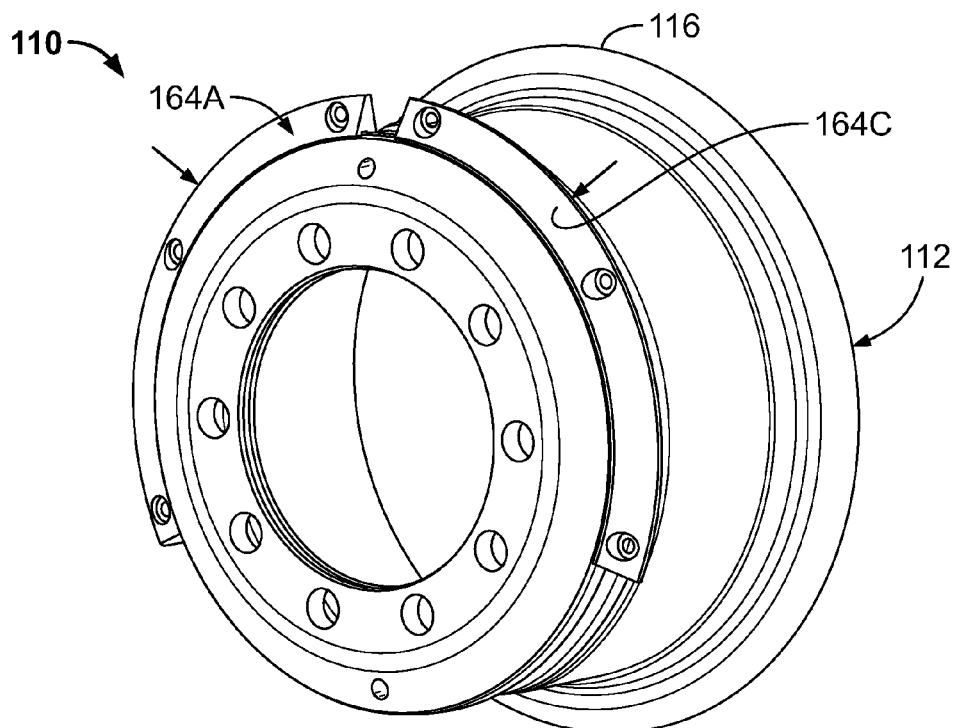
Figure 14C:
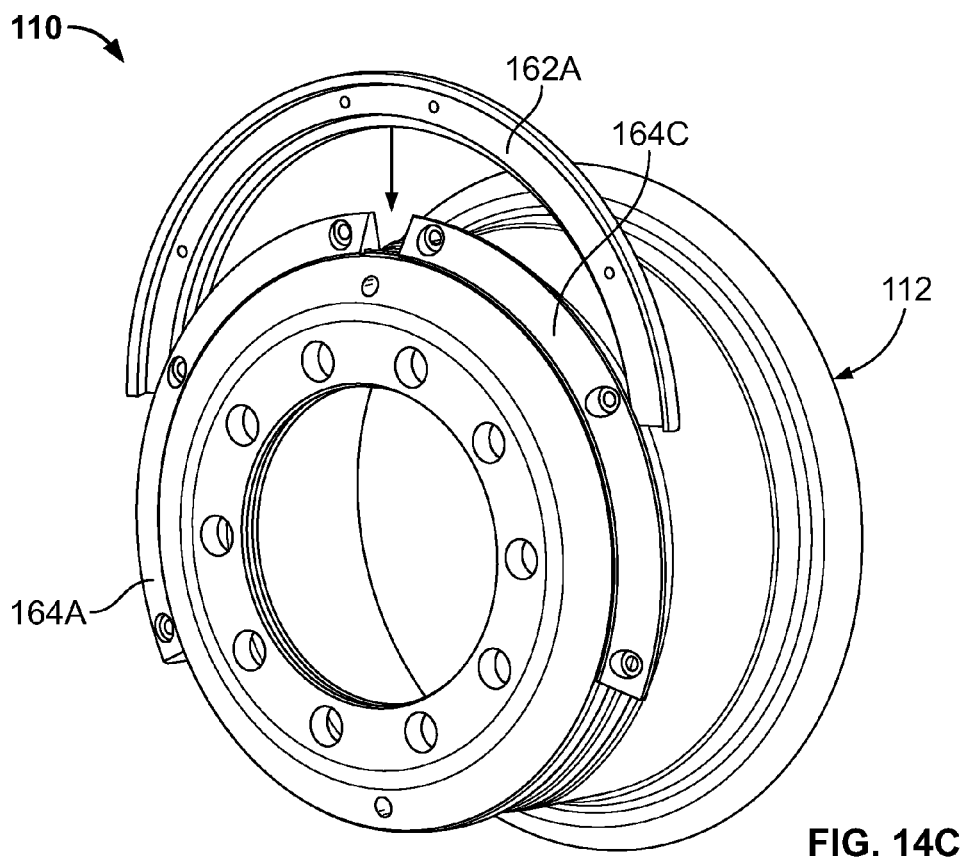
Figure 14D:
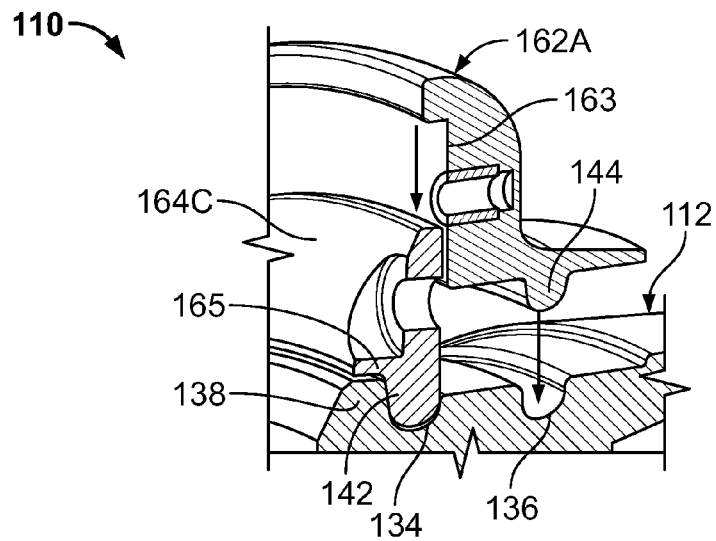
Figure 14E:
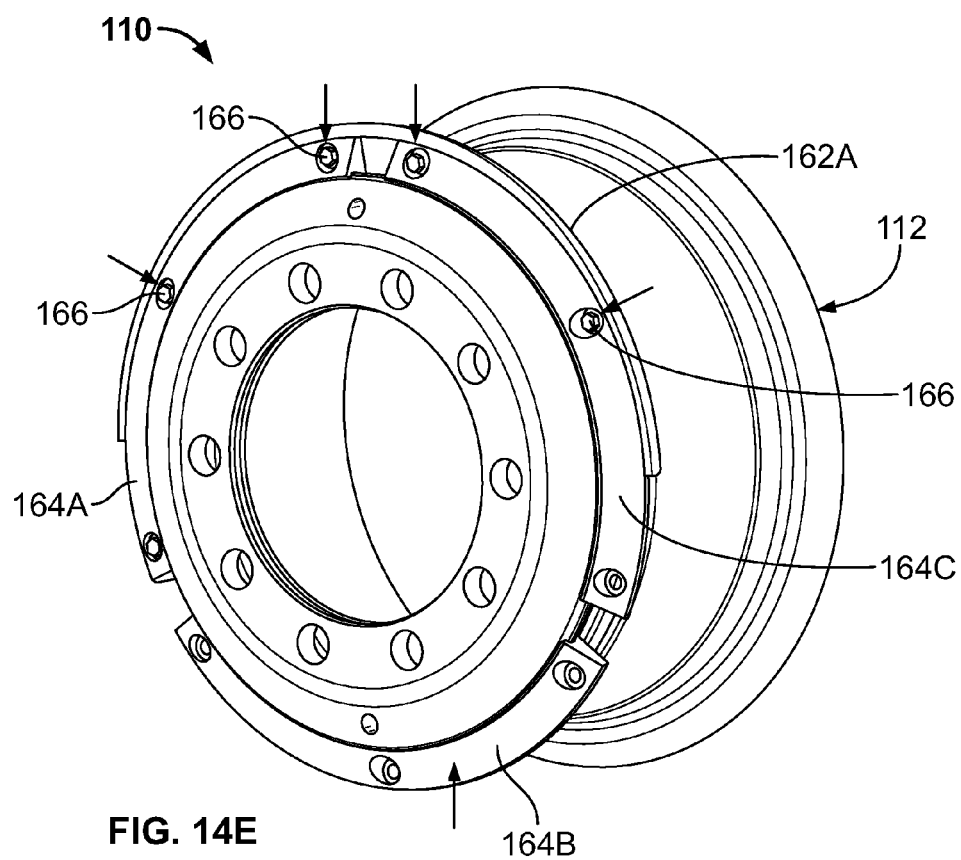
Figure 14F:
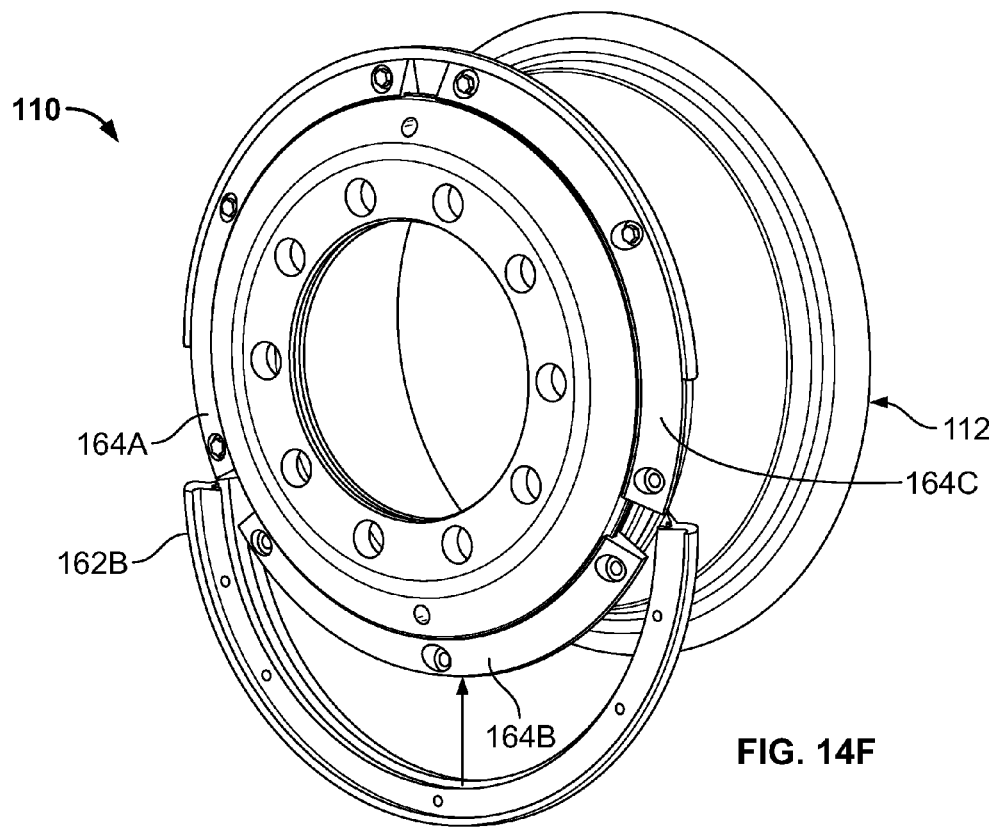
Figure 14G:
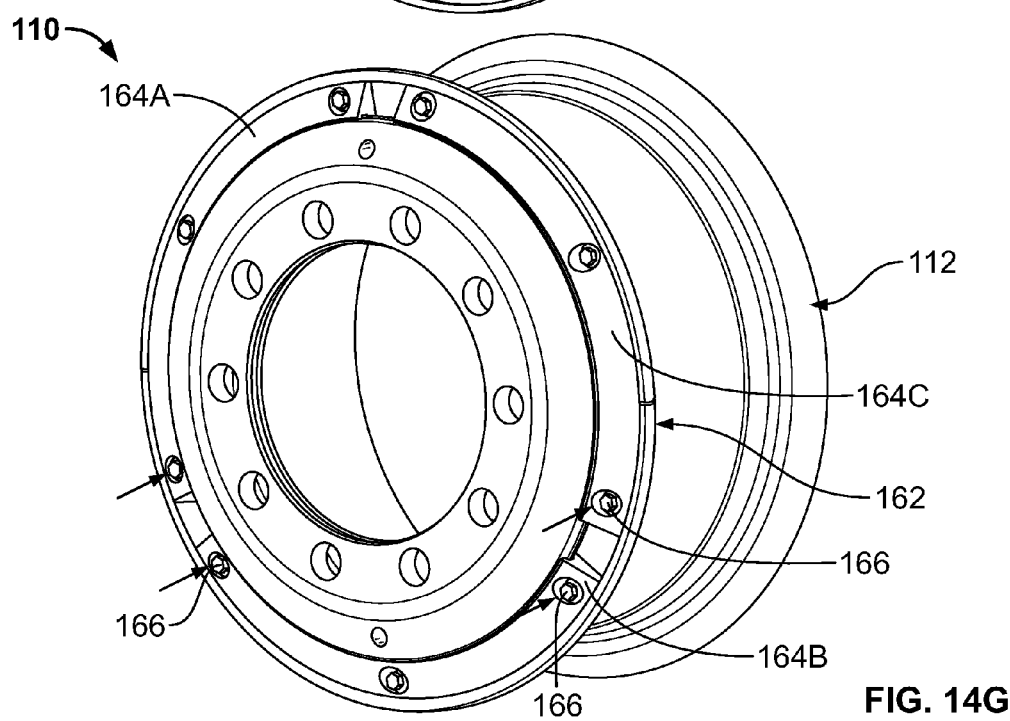

FIGS. 14A-14G show an assembly sequence for installing the removable bead seat 162 on a rim 112. As a preliminary step (FIG. 14A), the threaded inserts 168 are inserted into the threaded apertures 167 of the removable bead seat portions 162A, 162B (162A shown). As explained above, e.g., in reference to FIG. 3, when a tire and/or tube is mounted on the wheel 110, the tire may be compressed/ pushed against the monolithic bead seat 116. As shown in FIG. 14B, when the tire is compressed, a pair of retainers 164A, 164C may be held against the rim 112 with the annular ring members 142 thereof inserted into the first peripheral groove 134. As shown in 14C and 14D, a first of the bead seat portions 162A may then be slipped between the compressed tire/tube (not shown) bridging the pair of retainers 164A, 164C. The retainers 163A and 164C are received within recess 163 and annular lip 144 is received in peripheral groove 136. The support 165 rests on the annular retainer flange 138. As shown in FIG. 14E, bolts 166 may then be inserted through the retainers 164A, 164C and into the threaded inserts 168 in the bead seat portion 162A to couple the retainers 164A, 164C to the bead seat portion 162A. The third retainer 164B may then be placed with the annular ring 134 thereof inserted into the first peripheral groove 134. As shown in FIG. 14F, the second bead seat portion 162B may then be slipped between the compressed tire/tube (not shown), and the retainer 164B, bridging the retainers 164A, 164B, 164C. As shown in FIG. 14G, bolts 166 may then be inserted through the retainers 164A, 164B, 164C and into the threaded inserts 168 in the bead seat portion 162B to achieve the assembled wheel 110, allowing inflation of the mounted tire/inner tube (not shown).

When assembled as shown in FIG. 14G, the removable bead seat 162 cannot be withdrawn from the rim 112 without removing the bolts 166, including when the tire (not shown) is deflated. The assembled bead seat 162 is a continuous ring structure that is locked on the rim 112. When the tube/tire (not shown) is inflated to the position T2 shown in FIG. 9 and the tire bead under pressure P mounts the lead-in portion 146, the sloping surface 146U gives rise to the force vector PD, with the tire compressing the removable bead seat portions 162A, 162B radially inward against the rim 112. The annular ring 142 of the retainers 164A-C and the annular lip 144 of the removable bead seat portions 162A, 162B mate with and engage the surfaces of the grooves 134 and 136 to prevent the bead seat 162 from moving in the direction of the vector P. The support 165 bears against the annular retainer flange 138 preventing rotation of the removable bead seat 162 relative to the rim 112 (see FIG. 9). The lead-in portion 146 is an elongated flange that prevents the tire inflation load from detaching the bead seat portions 162A, 162B, directing the inflation pressure force radially (causing hoop loading) toward the center of the wheel 110.

FIGS. 15A-15F show an assembly sequence for installing a removable bead seat 262 like bead seat 162 on a rim 212 using retainers 264A-264C in accordance with an alternative embodiment. The rim 212 has a retainer flange 238 which is castellated by a plurality of slots 238S that communicate with the first peripheral groove 234, which is like grooves 34, 134 of the previous embodiments. The remainder portions 238R of the retainer flange 238 are intermittently distributed with the slots 238S around the periphery of the retainer flange 238. In a similar way, the inwardly directed semi-annular ring 242 of retainers 264A, 264C (264B not shown) is castellated by intermittent spaces 242S and remainder portions 242R, which could be called "tabs," in a pattern matching that of the castellation of the retainer flange 238. The retainers 264A-264C may be positioned in a first orientation (an install/disassemble orientation) where the remainder portions (tabs) 242R aligned with the spaces 238S of the retainer flange 238 and pressed back into the recess 230 of the bead seat portions 262A, 262B. Once in position in the recess 230, the retainers 264A-264C may be rotated to a second (locked) orientation wherein the reminder portions (tabs) 242R are aligned with the remainder portions 238R of the retainer flange 238, preventing the retainers 264A-264C to be withdrawn from the rim 212 while in that second or locked orientation. The bead seat portions 262A, 262B may be prepositioned on the rim 212 such that the threaded apertures 267 align with the apertures 269 in the retainers 264A-264C when the retainers are in the locked orientation. Alternatively, the bead seat portions 262A, 262B may be rotated relative to the rim 212 to align the apertures 267 with apertures 269 when the retainers 264A-264C are in the locked orientation. When the apertures 267 and 269 align and the retainers 264A-264C are in the locked orientation, threaded fasteners 266 may be inserted and tightened in the threaded apertures 267 to retain the retainers 264A-264C in the locked position on the wheel 212.

Figure 15A:
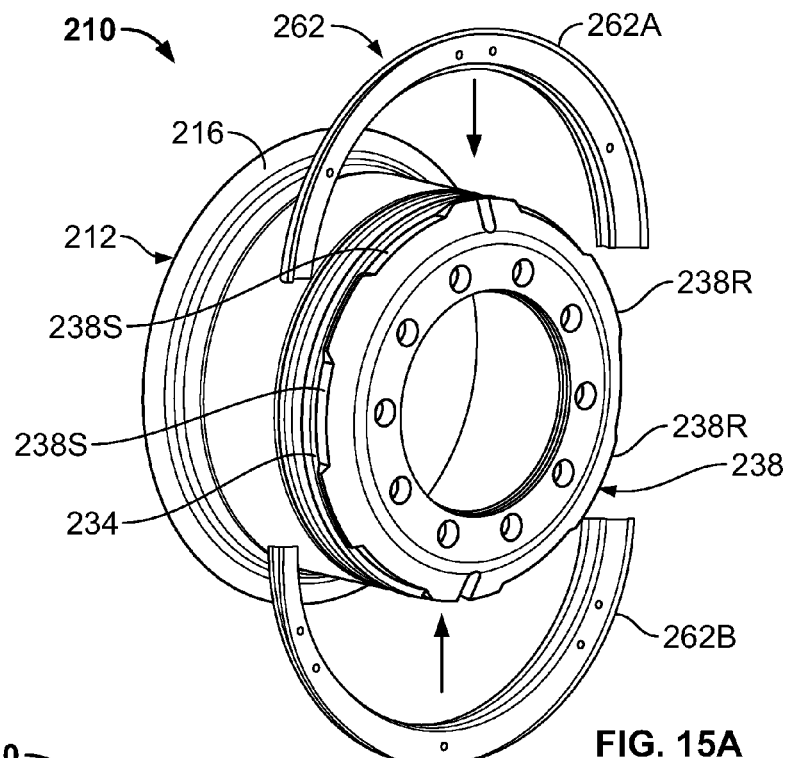
FIGS. 15A-15F is a series of schematic views of an alternative embodiment of a wheel, showing assembly of the wheel.
Figure 15B:
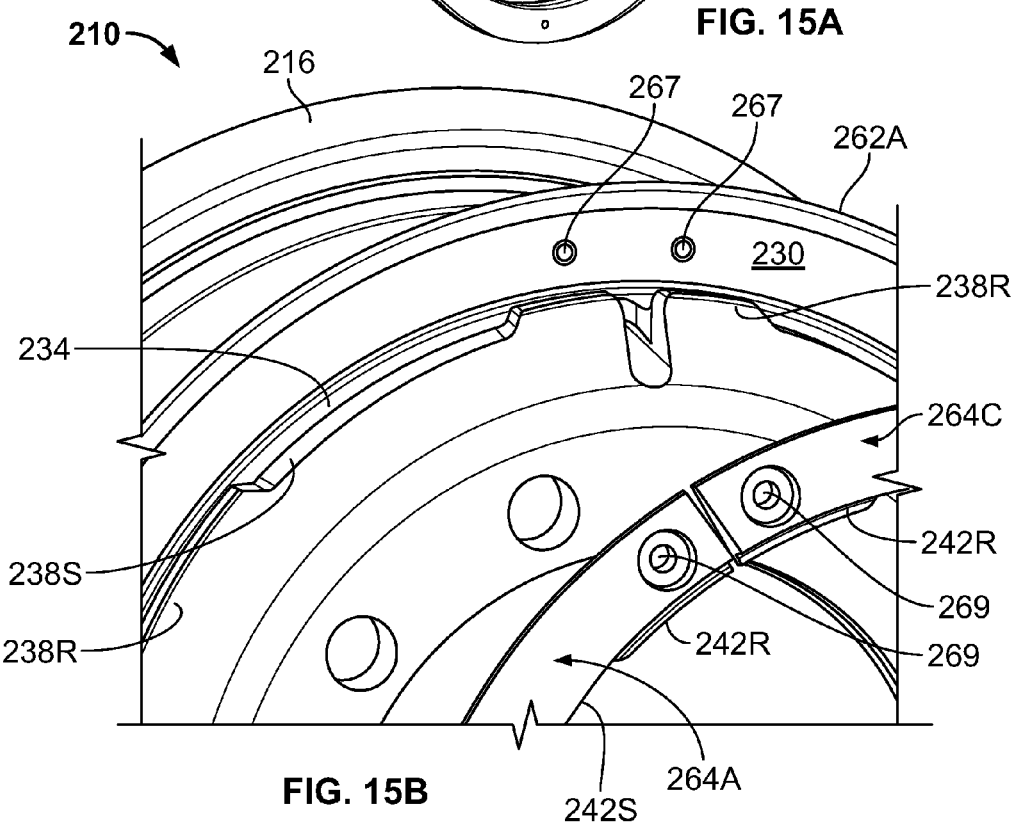
Figure 15C:
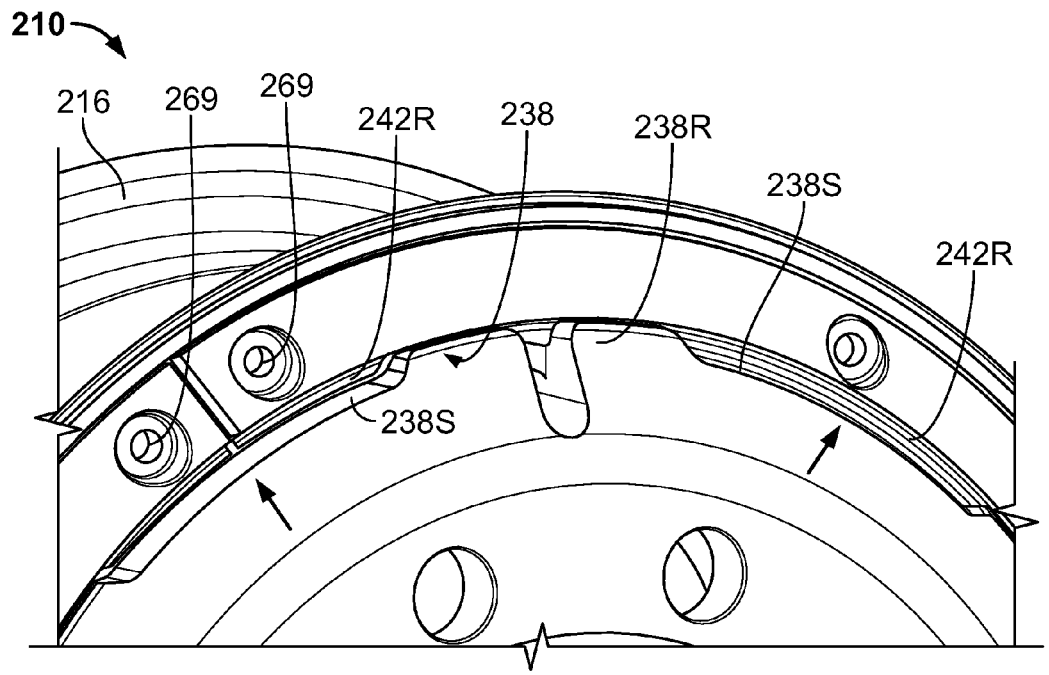
Figure 15D:
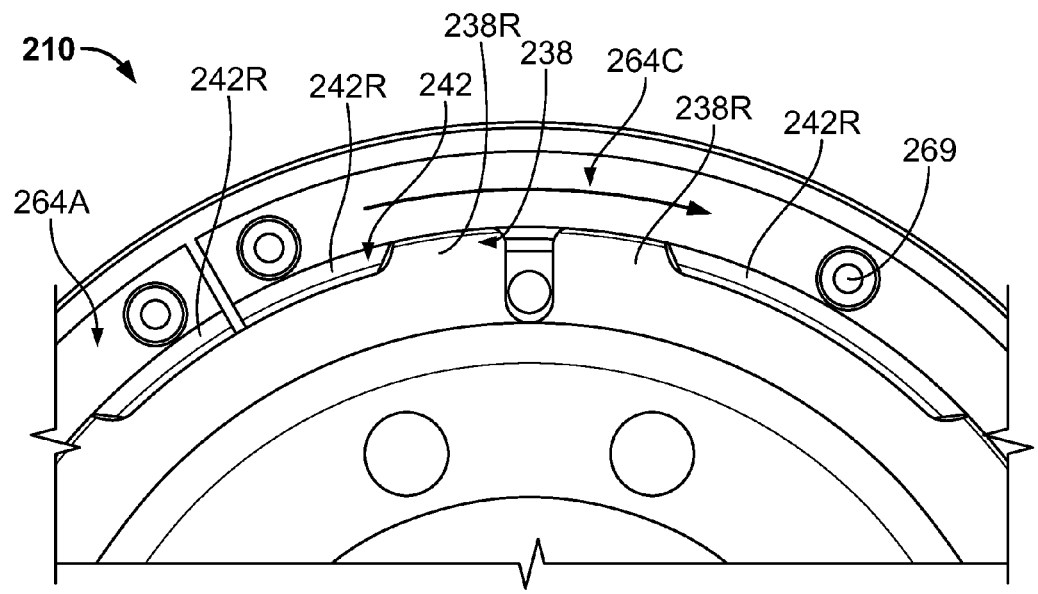
Figure 15E:
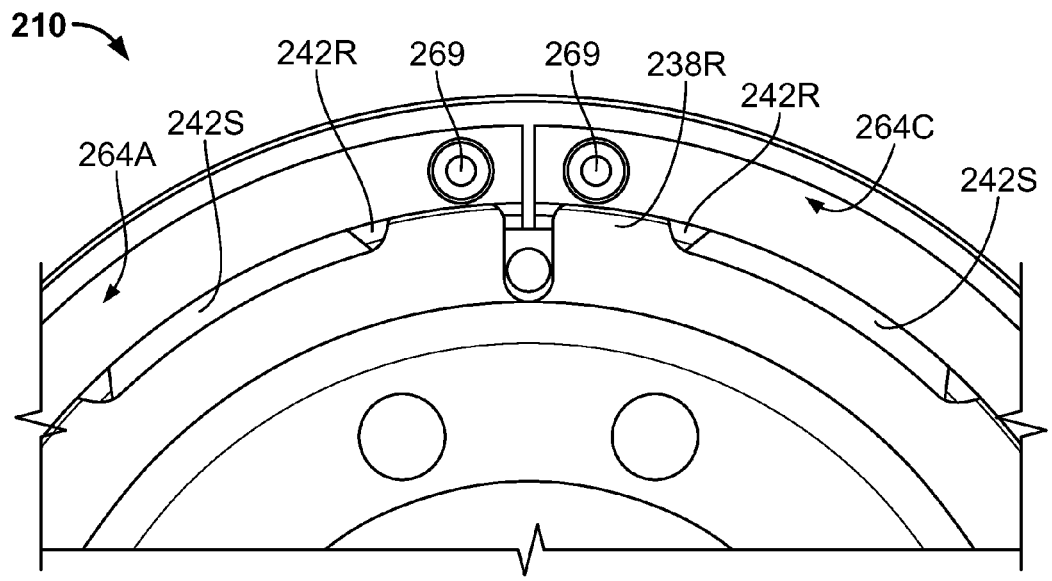
Figure 15F:
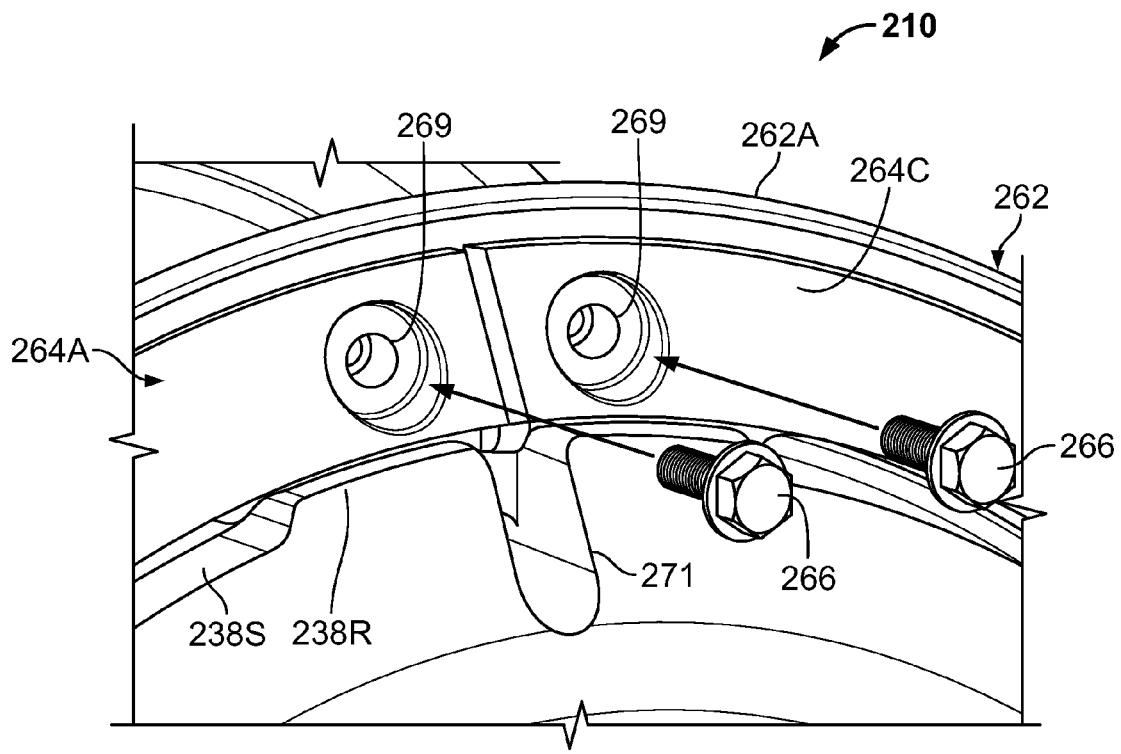
Figure 17:
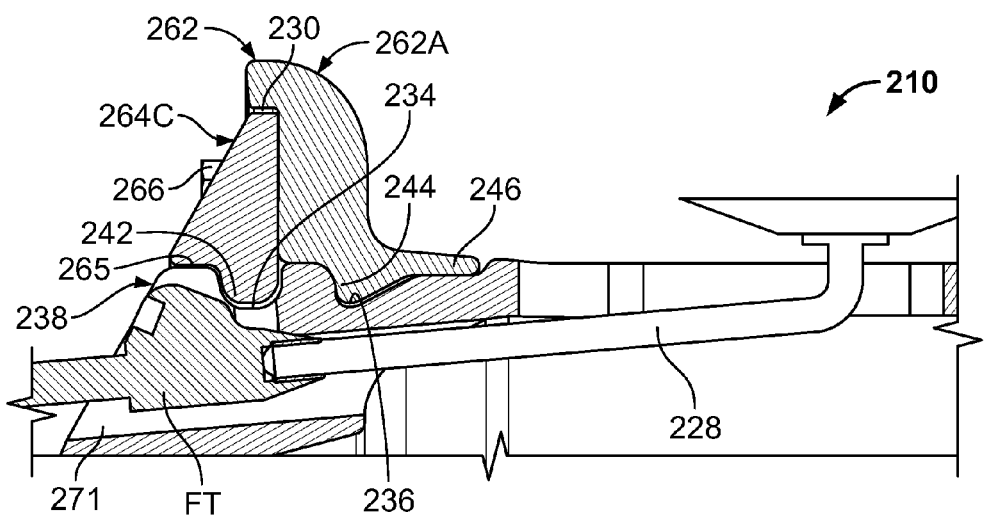
FIG. 17 is a cross-section of the wheel shown in FIG. 16.

As noted above relative to FIG. 14A, threaded inserts, like inserts 168 may be utilized in the threaded apertures 267. As explained above, e.g., in reference to FIG. 3, when a tire and/or tube is mounted on the wheel 210, the tire may be compressed/pushed against the monolithic bead seat 216. As shown in FIGS. 15A and 17, when the tire is inflated, a pair of bead seat portions 262A, 262B may be held against the rim 212 with the semi-annular lip 244 thereof inserted into the peripheral groove 236. The support 265 rests on the remainder portion 238R of the castellated annular retainer flange 238. As shown in FIGS. 15B and 15C, the retainers 264A, 264B, 264C (either individually or together) may be positioned with the remainder portions 242R of the semi-annular ring 242 aligned with the spaces 238S and then pushed back into the recess 230. The same actions would be conducted with a third retainer (not shown), if used, as in the embodiment of the wheel 110. As shown in FIGS. 15D and 15E, the retainers 264A, 264B, 264C may then be rotated to a position where the remainder 242R of the semi-annular ring 242 is aligned with the remainder 238R of the retainer flange 238 (the locked position). FIG. 15F shows the insertion of fasteners (bolts) 266 through the apertures 269 and into the threaded apertures 267 to fasten the retainers 264C, 264A to the bead seat portion 262A. The same actions would be conducted with a third retainer 264B (not shown), if used, as in the embodiment of the wheel 110. As in the embodiment of the wheel 110, the retainers 264A, 264B (not shown), 264C bridge adjacent bead seat portions 262A, 262B to form a unified bead seat assembly 262.

Figure 16:
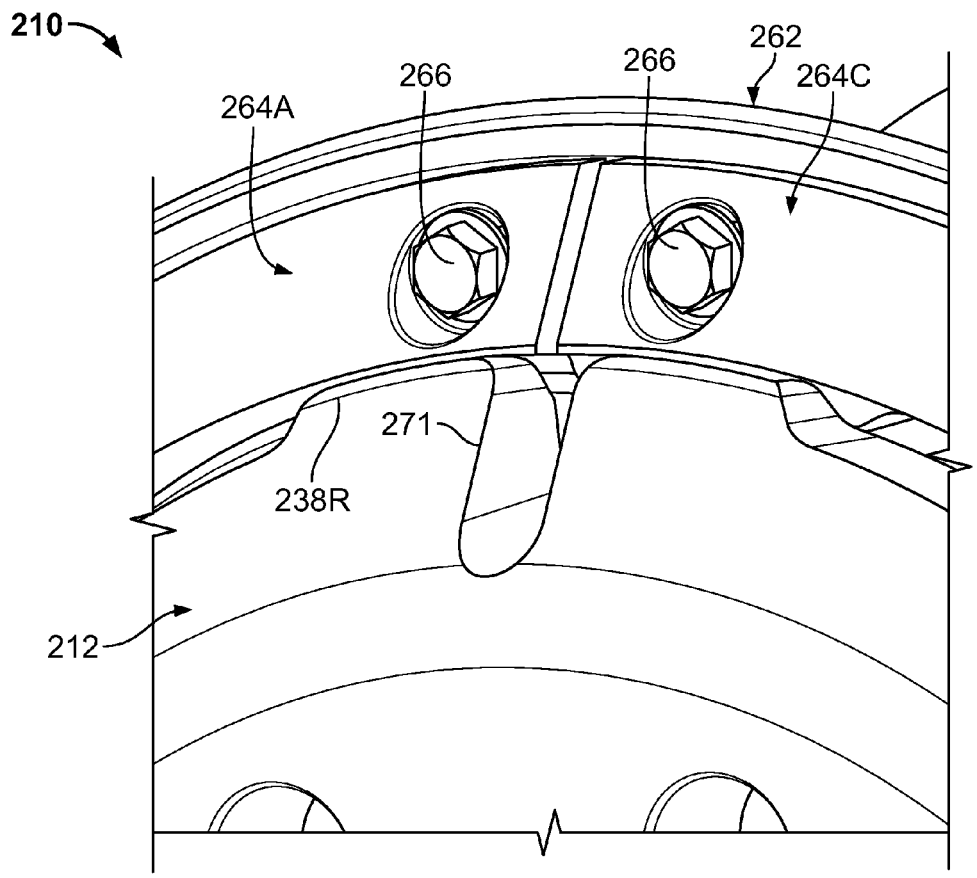
FIG. 16 is an enlarged view of a portion of the wheel shown in FIG. 15.

When assembled as shown in FIGS. 16 and 17, the removable bead seat assembly 262 cannot be withdrawn from the rim 212 without removing the bolts 266. When the tube/tire is inflated to the position T2 shown in FIG. 9, the tire bead under pressure P mounts the lead-in portion 246, compressing the removable bead seat portions 262A, 262B radially inward against the rim 212. The semi-annular ring 242 of the retainers 264A-264C and the annular ring 244 of the removable bead seat portions 262A, 262B mate with and engage the surfaces of the grooves 234 and 236 to prevent the bead seat 262 from moving in the direction of the vector P (See FIG. 9). The support 265 bears against the annular retainer flange 238 preventing movement of the removable bead seat 262 relative to the rim 212 (in a direction parallel to the axis of rotation of the wheel 210). An elongated aperture 271 provides access to an air fill valve 228 by tool FT connected to a supply of compressed air. While the embodiment shown in FIGS. 15-17 utilizes two or three retainers 264A, 264C (264 B not shown but having a similar arc length as retainer 164B of wheel 110), a greater or lesser number may be used. For example, a single ring-shaped retainer 264 could be employed since it could be oriented in an install orientation and then moved parallel to the rotational axis of the wheel to pass through the slots 238S and into groove 234 and then rotated to a locked orientation.

FIG. 18 shows an alternative interface 339 between the surfaces 336F of a groove 336 comparable to grooves 36, 136, 236 of the previously disclosed embodiments of the wheels 10, 110, 210 and surface 344F of semi-annular lip 344 comparable to semi-annular lips 44, 144, 244. More particularly, the surfaces are canted from the radial (vertical) creating a pawl-type of engagement when subjected to forces having a component in the direction of vector F. This engagement may be obtained by inserting the semi-annular lip 344 into the groove 336 such that the edge 344E clears edge 336E when the bead seat portion 362A or 362B is lowered down on the rim 312 and then slid forward into engagement as shown.

While the wheels 10, 110, 210 described above have one monolithically formed bead seat 16, 116, 216 and one removable bead seat 22, 162, 262 the wheels 10, 110, 210 could incorporate two removable bead seats 22, 162, 262 with one removable bead seat replacing the monolithically formed bead seat 16, 116, 216 in a similar manner to how the removable bead seat 22, 162, 262 is held to the rim 12, 112, 212 as described above. In this manner, a tire could be mounted and demounted from either side, e.g., when the wheel is mounted to a hub of a vehicle in either a single or dual mount configuration, which may be useful in repairing a flat tire in the field.

When executed in aluminum alloy, the above-described embodiments exhibit the beneficial attributes of aluminum alloy wheels, such as light weight, durability and high load capacity which may result in fuel savings, greater service life for rim and tire and reduced mechanical stress and wear on drive line and brake components including engine, transmission, rear, and braking systems. In addition, the multi-piece construction of a wheel in accordance with the present disclosure allows the servicing of tire and tube by mounting/demounting the tire and tube via disassembly of the bead seat from the rim component. This process can be accomplished in the field without the specialized equipment like that required to mount and demount tires on a one-piece rim.

It will be understood that the embodiments described herein are merely exemplary and that a person skilled in the art may make many variations and modifications without departing from the spirit and scope of the claimed subject matter. For example, while the present disclosure is directed primarily to a removable bead seat 22, 122 having two separate portions, 22A, 22B, 122A, 122B, more than two portions, e.g., three or four portions could be utilized in forming the removable bead seat 22, 122. In such cases, the three or four portions would have a similar form to the two portions 22A, 22B, 122A, 122B, except that they would extend for a smaller arc length. All such variations and modifications are intended to be included within the scope of the claims.

We claim:

1. A wheel for supporting a pneumatic tire, comprising:
a generally cylindrical rim with a first bead seat peripherally disposed thereon proximate one end, the rim having a first groove in an outer peripheral surface thereof distal to the first bead seat;
a removable bead seat with a plurality of sub-parts capable of engaging the first groove, retaining the removable bead seat and the tire on the rim, the plurality of sub-parts including two semi-circular bead seat portions, each of which approximates a mirror image of the other and when assembled together at an axis of symmetry, approximate a solid of rotation capable of embracing the rim proximate the first groove, the solid of rotation having a generally L-shaped cross-section with a lead-in portion forming the long part of the L and an upstanding bead extending in a direction perpendicular to the lead-in portion and forming the short portion of the L-shape, the lead-in portion extending generally parallel to the rim when embracing it, each of the two bead seat portions having an inwardly directed lip extending from an inner surface on the long part of the L shape extending in a direction opposite to the upstanding bead, the lip capable of being received in the first groove when the bead seat portions are positioned on the rim embracing the rim.

2. The wheel of claim 1, wherein the wheel is made of aluminum alloy.

3. The wheel of claim 1, wherein the first bead seat is monolithic with the rim.

4. The wheel of claim 1, wherein the inwardly directed lip is a first lip and wherein the rim has a second groove in the outer peripheral surface thereof distal to the first groove and the first bead seat and each of the bead seat portions has a second inwardly extending lip extending therefrom in a direction parallel to the direction of extension of the first lip, the second lip capable of being received in the second groove when the bead seat portions are positioned on the rim embracing the rim.

5. The wheel of claim 4, wherein the second lip is monolithically formed with the bead seat portion from which it extends.

6. The wheel of claim 5, wherein the second groove defines a flange on the rim.

7. The wheel of claim 6, wherein a plurality of apertures extend through the flange, the second lip and the rim, and further including a plurality of pins capable of passing through the apertures in the flange, the second lip and the rim, bridging the second groove and retaining each of the bead seat portions in association with the rim.

8. The wheel of claim 7, wherein the pins prevent rotation of the removable bead seat relative to the rim.

9. The wheel of claim 7, wherein the pins retain the removable bead seat on the rim when the tire is deflated.

10. The wheel of claim 1, wherein the rim proximate the first groove has a reduced diameter relative to an adjacent portion proximate the bead seat, the reduced diameter portion having a diameter reduced by an amount approximating the thickness of the lead-in portions of the bead seat portions.

11. The wheel of claim 10, wherein the lead-in portion of each of the semi-circular members exhibits a gradually increased thickness from an edge thereof to the bead seat.

12. The wheel of claim 1, wherein the wheel has a mounting flange with a plurality of lug apertures at one end capable of mounting the wheel to a wheel hub.

13. The wheel of claim 12, wherein the mounting flange of a first wheel may be juxtaposed next to the mounting flange of a second wheel to form a dually that is capable of mounting to a wheel hub.

14. The wheel of claim 1, wherein the rim has a second groove in the outer peripheral surface thereof distal to the first groove and the first bead seat and further comprising a retainer selectively attachable to at least one of the bead seat portions by threaded fasteners, a second lip extending from the retainer, the second lip capable of being received in the second groove when the bead seat portion is positioned on and embracing the rim.

15. The wheel of claim 14, wherein a plurality of retainers are coupled to a plurality of bead seat portions.

16. The wheel of claim 15, wherein the retainers are arcuate in shape.

17. The wheel of claim 15, wherein the threaded fasteners extend through apertures in the retainers and are received in threaded apertures in the bead seat portions.

18. The wheel of claim 17, wherein the bead seat portions have a recess complementary in shape to the retainers for receiving the retainers when selectively coupled thereto.

19. The wheel of claim 18, wherein at least one retainer bridges and couples to a plurality of bead seat portions.

20. The wheel of claim 19, wherein the removable bead seat encircles the rim, preventing removal of the bead seat from the rim without disassembling the removable bead seat.

21. The wheel of claim 20, wherein the removable bead seat is capable of being retained on the rim when the tire is deflated, preventing removal without disassembling the removable bead seat.

22. The wheel of claim 18, wherein the retainers have a peripheral ledge that bears against an edge of the second groove and is capable of constraining rotation of the retainers and a conjoined bead seat portion in a direction perpendicular to an axis of the wheel under the influence of pressure from a tire mounted on the wheel.

23. The wheel of claim 18, wherein each recess defines a boundary preventing withdrawal of the retainer received therein when the tire is inflated and irrespective of the presence of threaded fasteners.

24. The wheel of claim 17, wherein the threaded apertures have a threaded insert therein.

25. The wheel of claim 24, wherein the threaded insert is a coil.

26. The wheel of claim 14, wherein the retainer is a ring and the second lip is castellated to define a plurality of tabs and intermittent spaces and the rim has a plurality of slots communicating with the second groove, the tabs capable of inserting through the slots in a first rotational orientation coaxial with the wheel to enter the second groove and capable of being rotated on the rim to a second position where the slots and tabs are not aligned.

27. The wheel of claim 1, wherein the lead-in portion is capable of preventing tire inflation load from displacing an associated bead seat portion.

28. The wheel of claim 1, wherein the lead-in portion is capable of directing tire inflation pressure force radially towards an axis of the wheel.

* * * * *